United States Patent
Remes et al.

(10) Patent No.: US 11,908,670 B2
(45) Date of Patent: Feb. 20, 2024

(54) SYSTEMS AND METHODS OF ION POPULATION REGULATION IN MASS SPECTROMETRY

(71) Applicant: Thermo Finnigan LLC, San Jose, CA (US)

(72) Inventors: Philip M. Remes, Livermore, CA (US); Jesse D. Canterbury, Shoreline, WA (US)

(73) Assignee: Thermo Finnigan LLC, San Jose, CA (US)

( * ) Notice: Subject to any disclaimer, the term of this patent is extended or adjusted under 35 U.S.C. 154(b) by 30 days.

(21) Appl. No.: 17/745,780

(22) Filed: May 16, 2022

(65) Prior Publication Data
US 2023/0369036 A1    Nov. 16, 2023

(51) Int. Cl.
| H01J 49/00 | (2006.01) |
| G06N 3/08 | (2023.01) |
| G01N 30/86 | (2006.01) |
| G01N 30/72 | (2006.01) |

(52) U.S. Cl.
CPC ...... *H01J 49/0036* (2013.01); *G01N 30/7233* (2013.01); *G01N 30/8675* (2013.01); *G06N 3/08* (2013.01)

(58) Field of Classification Search
CPC ............ H01J 49/0036; G01N 30/7233; G01N 30/8675; G06N 3/08
USPC ................................................ 250/281, 282
See application file for complete search history.

(56) References Cited

U.S. PATENT DOCUMENTS

| 11,131,655 B2 | 9/2021 | Thoeing et al. |
| 11,594,404 B1 * | 2/2023 | Remes ................... G01N 30/72 |
| 2014/0252218 A1 | 9/2014 | Wright et al. |
| 2019/0154642 A1 | 5/2019 | Fujito |
| 2022/0198326 A1 | 6/2022 | King |
| 2022/0208535 A1 | 6/2022 | Remes |

FOREIGN PATENT DOCUMENTS

| CN | 111667889 B | 3/2022 |
| EP | 3 690 436 A1 | 8/2020 |
| WO | 2016196432 A1 | 12/2016 |

OTHER PUBLICATIONS

Melnikov et al. "Deep learning for the precise peak detection in high-resolution LC-MS data" Analytical Chemistry, Dec. 16, 2019, vol. 92, No. 1, pp. 588-592.

Wang et al. "MSpectralAI: a powerful platform for deciphering proteome profiling of multi-tumor mass spectometry data by using deep neural networks" BMC Bioinformatics, 2020, vol. 21, No. 439, 15 pages.

* cited by examiner

*Primary Examiner* — Michael Maskell
(74) *Attorney, Agent, or Firm* — Thomas F. Cooney; ALG Intellectual Property, LLC

(57) ABSTRACT

A method of performing mass spectrometry includes accessing a series of mass spectra of detected ions derived from components eluting from a chromatography column; obtaining, based on the series of mass spectra, an elution profile including a plurality of detection points representing intensity of at least a set of the detected ions as a function of time; and determining, based on a set of detection points included in the plurality of detection points, a predicted next detection point of the elution profile to be obtained based on a next mass spectrum to be acquired subsequent to acquisition of the series of mass spectra.

24 Claims, 15 Drawing Sheets

SYSTEMS AND METHODS OF ION POPULATION REGULATION IN MASS SPECTROMETRY

BACKGROUND INFORMATION

A mass spectrometer is a sensitive instrument that may be used to detect, identify, and/or quantify molecules based on their mass-to-charge ratio (m/z). A mass spectrometer generally includes an ion source for generating ions from components included in the sample, a mass analyzer for separating the ions based on their m/z, and an ion detector for detecting the separated ions. The mass spectrometer may be connected to a computer-based software platform that uses data from the ion detector to construct a mass spectrum that shows a relative abundance of each of the detected ions as a function of m/z. The m/z of ions may be used to detect and quantify molecules in simple and complex mixtures. A separation device such as a liquid chromatograph (LC) or gas chromatograph (GC) may be coupled to the mass spectrometer (MS) in a combined system (e.g., LC-MS or GC-MS system) to separate components included in the sample before the components are introduced to the mass spectrometer.

For trapping-type mass analyzers, such as quadrupole ion traps and Orbitrap™ electrostatic trap mass analyzers (manufactured by Thermo Fisher Scientific of Waltham, MA), best analytical performance is often achieved when the number of ions analyzed is within a certain target range. Too few ions result in noisy spectra or the need to co-add multiple spectra, while too many ions can result in space-charge effects such as mass shifts, peak broadening, and coalescence. Beam-type instruments, such as time-of-flight (ToF) and quadrupole mass filters, also operate best when the ion flux at their detectors is within a certain range. Both trapping-type and beam-type devices may be used with intermediate ion storage traps that accumulate ions to buffer down-stream processes such as mass analysis, thereby increasing scan speed and instrument sensitivity. These ion storage traps also have limited capacities, where over-filling can lead to deleterious effects, such as mass discrimination and loss of linearity, as the amount of signal detected is no longer linear with ion accumulation time.

Automated gain control (AGC) may be performed to regulate ion population in trapping-type and beam-type devices. In the case of filling a trapping device with a target number of ions, conventional AGC may be performed by using a gate apparatus that either transmits or blocks ions. Using estimates of the ion flux, the gate is opened for a given amount of time to accumulate a target number of ions in the device, after which the gate is closed until the accumulated ions are transferred out of the device. Alternatively, and especially in the case of beam-type devices, attenuation devices or partial gates may be used to regulate the ion flux to a level that does not saturate an analyzer or detector.

In conventional AGC methods, the accumulation time to be used for acquisition of a mass spectrum is estimated based on the ion flux of a prior (most recent) acquisition. However, conventional AGC methods assume that the ion flux will remain constant for the next acquisition, and thus the conventional AGC methods fail to account for the rapidly changing nature of the ion flux (e.g., ion intensity) during LC-MS or GC-MS analyses. As a result, the conventional AGC methods may overshoot the target number of ions while the ion flux is increasing and undershoot the target number of ions while the ion flux is decreasing, both of which may degrade analytical performance. The shortcomings of conventional AGC techniques are exacerbated when the ion flux-versus-time curve has a non-Gaussian profile in which the ion flux quickly increases from a baseline level to a peak maximum and then gradually decreases from the peak maximum back to the baseline level. In these situations, the number of ions accumulated while the ion flux is increasing may be even larger than when the ion flux has a Gaussian profile.

One method of addressing these problems uses a conventional AGC scheme while decreasing the time between analytical scans. This brute force approach offers some improvement in ion population regulation accuracy but comes at the cost of efficiency. For example, when the AGC scheme uses dedicated prescans to estimate ion flux, the time used for prescans cannot be used to acquire analytical scans. When the AGC scheme uses a prior analytical scan for ion flux estimation, the analytical scan must be repeated more often, thereby reducing the instrument capacity. Moreover, increasing the sampling rate is not entirely effective except at the limit of small numbers of analytes being assayed.

For at least these reasons, there is a need for improved methods and systems for regulating ion population in mass spectrometry.

SUMMARY

The following description presents a simplified summary of one or more aspects of the methods and systems described herein in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

In some illustrative embodiments, a method of performing mass spectrometry comprises obtaining, based on a series of mass spectra of detected ions derived from components eluting from a chromatography column, an elution profile comprising a plurality of detection points representing intensity of the detected ions as a function of time; and determining, based on a set of detection points included in the plurality of detection points, a predicted next detection point of the elution profile to be obtained based on a next mass spectrum to be acquired.

In some illustrative embodiments, an apparatus for performing mass spectrometry comprises a mass analyzer configured to acquire, over time, a series of mass spectra of detected ions derived from components eluting from a chromatography column; and a computing device configured to: obtain, based on the series of mass spectra, an elution profile comprising a plurality of detection points representing intensity of the detected ions as a function of time; and determine, based on a set of detection points included in the plurality of detection points, a predicted next detection point of the elution profile to be obtained based on a next mass spectrum to be acquired by the mass analyzer subsequent to acquisition of the series of mass spectra.

In some illustrative embodiments, a method of performing mass spectrometry comprises obtaining, based on a series of mass spectra of detected ions derived from components eluting from a chromatography column, a plurality of extracted ion chromatograms (XICs), each XIC comprising a plurality of detection points representing detected intensity for a distinct selected m/z as a function of time; detecting, based on the series of mass spectra, precursor ions having each selected m/z of the plurality of XICs; and determining, for each XIC based on a set of detection points of the XIC, a predicted next detection point to be obtained based on a next mass spectrum to be acquired.

In some illustrative embodiments, a computer-implemented method of training a machine learning model comprises accessing an elution profile comprising a plurality of detection points representing intensity of ions derived from components eluting from a chromatography column and detected by a mass analyzer as a function of time; generating, based on the elution profile, training data comprising a plurality of training examples, a training example of the plurality of training examples comprising a set of detection points and a target next detection point, the target next detection point comprising a detection point of the plurality of detection points following the set of detection points; and training, using the training data, the machine learning model to determine a predicted next detection point, the predicted next detection point following the set of detection points.

In some illustrative embodiments, a non-transitory computer-readable medium stores instructions that, when executed, cause a processor of a computing device to obtain, based on a series of mass spectra of detected ions derived from components eluting from a chromatography column, an elution profile comprising a plurality of detection points representing intensity of the detected ions as a function of time; and determine, based on a set of detection points included in the plurality of detection points, a predicted next detection point of the elution profile to be obtained based on a next mass spectrum to be acquired.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
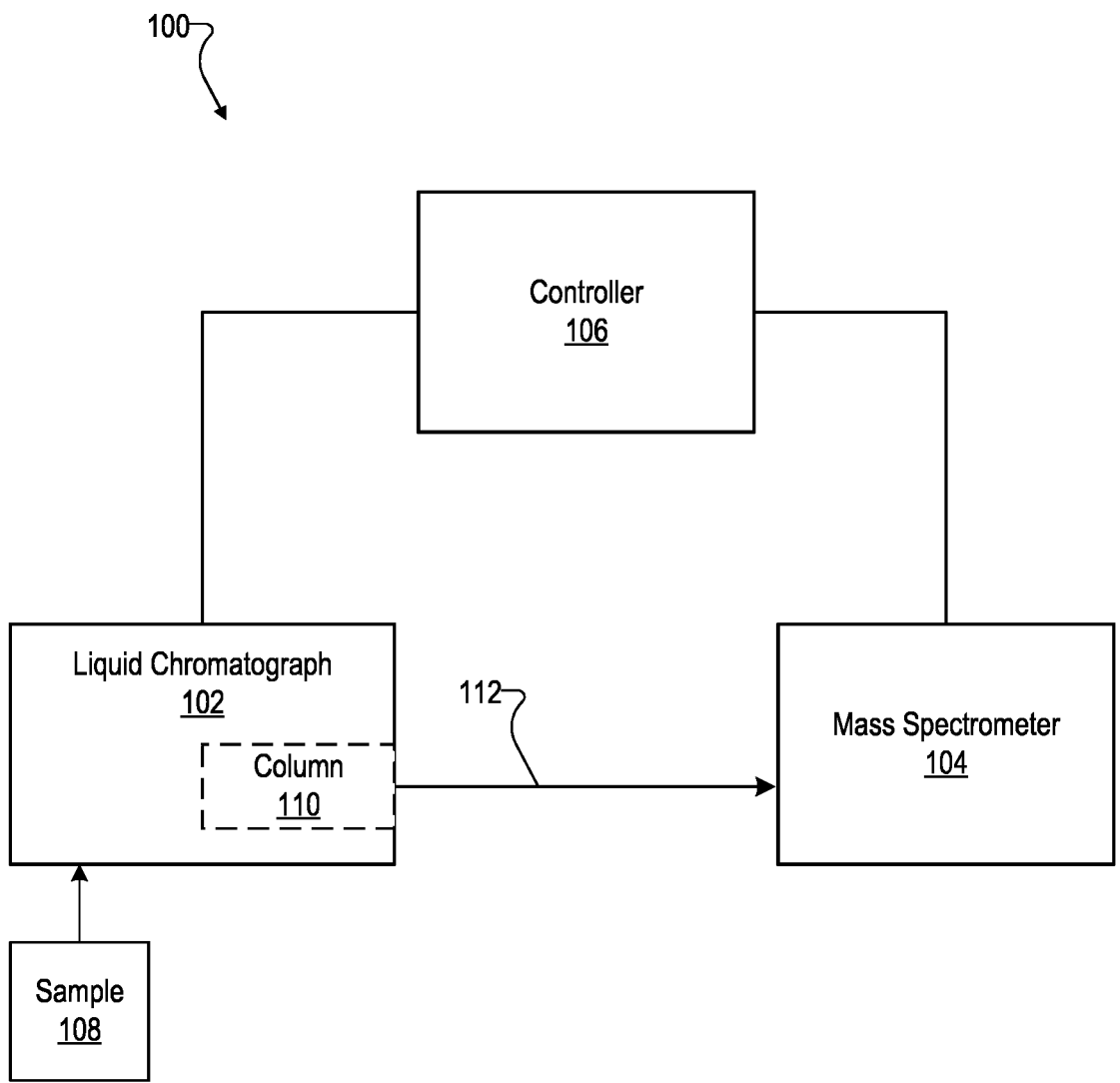
FIG. 1 shows an illustrative LC-MS system including a liquid chromatograph and a mass spectrometer.

Methods, apparatuses, and systems for determining a predicted next detection point in an elution profile and performing mass spectrometry using the predicted next detection point are described herein. For example, a method of performing mass spectrometry may include obtaining, based on a series of mass spectra of detected ions derived from components eluting from a chromatography column, an elution profile comprising a plurality of detection points. The plurality of detection points represent intensity of the detected ions as a function of time. Based on a set of detection points included in the plurality of detection points, a predicted next detection point of the elution profile is determined. The predicted next detection point is a next detection point to be obtained based on a next mass spectrum to be acquired.

In some examples, an accumulation time for accumulating the ions may be set, based on the predicted next detection point, for an acquisition of the next mass spectrum. In further examples, the elution profile comprises an extracted ion chromatogram for a selected m/z. Based on the series of mass spectra, precursor ions having the selected m/z may be detected and the determining of the predicted next detection point may be performed based on detecting the ions having the selected m/z. Based on the predicted next detection point, a data-dependent acquisition of product ions produced from the precursor ions may be performed.

The methods, apparatuses, and systems described herein provide various benefits. For example, by determining a predicted next detection point as described herein, the ion accumulation time may be set accurately to prevent overfilling and/or underfilling an ion accumulator. Additionally, a predicted next detection point may be used to initiate a data-dependent action, such as a data-dependent acquisition, at an appropriate time, thereby improving quality of the acquired signals.

Various embodiments will now be described in more detail with reference to the figures. The systems and methods described herein may provide one or more of the benefits mentioned above and/or various additional and/or alternative benefits that will be made apparent herein.

In some implementations, the methods and systems for performing ion population regulation may be used in conjunction with a combined separation-mass spectrometry system, such as an LC-MS system. As such, an LC-MS system will now be described. The described LC-MS system is illustrative and not limiting. The methods and systems described herein may operate as part of or in conjunction with the LC-MS system described herein and/or with any other suitable separation-mass spectrometry system, including a high-performance liquid chromatography-mass spectrometry (HPLC-MS) system, a gas chromatography-mass spectrometry (GC-MS) system, or a capillary electrophoresis-mass spectrometry (CE-MS) system. The methods and systems described herein may also operate in conjunction with any other continuous flow sample source, such as a flow-injection MS system (FI-MS) in which analytes are injected into a mobile phase (without separation in a column) and enter the mass spectrometer with time-dependent variations in intensity (e.g., Gaussian-like peaks).

FIG. 1 shows an illustrative LC-MS system 100. LC-MS system 100 includes a liquid chromatograph 102, a mass spectrometer 104, and a controller 106. Liquid chromatograph 102 is configured to separate, over time, components (e.g., analytes) within a sample 108 that is injected into liquid chromatograph 102. Sample 108 may include, for example, chemical components (e.g., molecules, ions, etc.) and/or biological components (e.g., metabolites, proteins, lipids, etc.) for detection and analysis by LC-MS system 100. Liquid chromatograph 102 may be implemented by any liquid chromatograph as may suit a particular implementation. In liquid chromatograph 102, sample 108 may be injected into a mobile phase (e.g., a solvent), which carries sample 108 through a column 110 containing a stationary phase (e.g., an adsorbent packing material). As the mobile phase passes through column 110, components within sample 108 elute from column 110 at different times based on, for example, their size, their affinity to the stationary phase, their polarity, and/or their hydrophobicity.

A detector (e.g., an ion detector component of mass spectrometer 104, an ion-electron converter and electron multiplier, etc.) may measure the relative intensity of a signal modulated by each separated component in eluate 112 from column 110. Data generated by the detector may be represented as a chromatogram, which plots retention time on the x-axis and a signal representative of the relative intensity on the y-axis. The retention time of a component is generally measured as the period of time between injection of sample 108 into the mobile phase and the relative intensity peak maximum after chromatographic separation. In some examples, the relative intensity may be correlated to or representative of relative abundance of the separated components. Data generated by liquid chromatograph 102 may be output to controller 106.

In some cases, particularly in analyses of complex mixtures, multiple different components in sample 108 may co-elute from column 110 at approximately the same time, and thus may have the same or similar retention times. As a result, determination of the relative intensity of the individual components within sample 108 requires further separation of signals attributable to the individual components. To this end, liquid chromatograph 102 directs components included in eluate 112 to mass spectrometer 104 for identification and/or quantification of one or more of the components.

Mass spectrometer 104 is configured to produce ions from the components received from liquid chromatograph 102 and sort or separate the produced ions based on m/z of the ions. A detector in mass spectrometer 104 measures the intensity of the signal produced by the ions. As used herein, "intensity" may refer to any suitable metric indicative of or related to detected intensity, such as abundance, relative abundance, ion count, intensity, or relative intensity. Data generated by the detector may be represented by mass spectra, which plot the intensity of the observed signal as a function of m/z of the detected ions. Data acquired by mass spectrometer 104 may be output to controller 106.

Figure 2A:
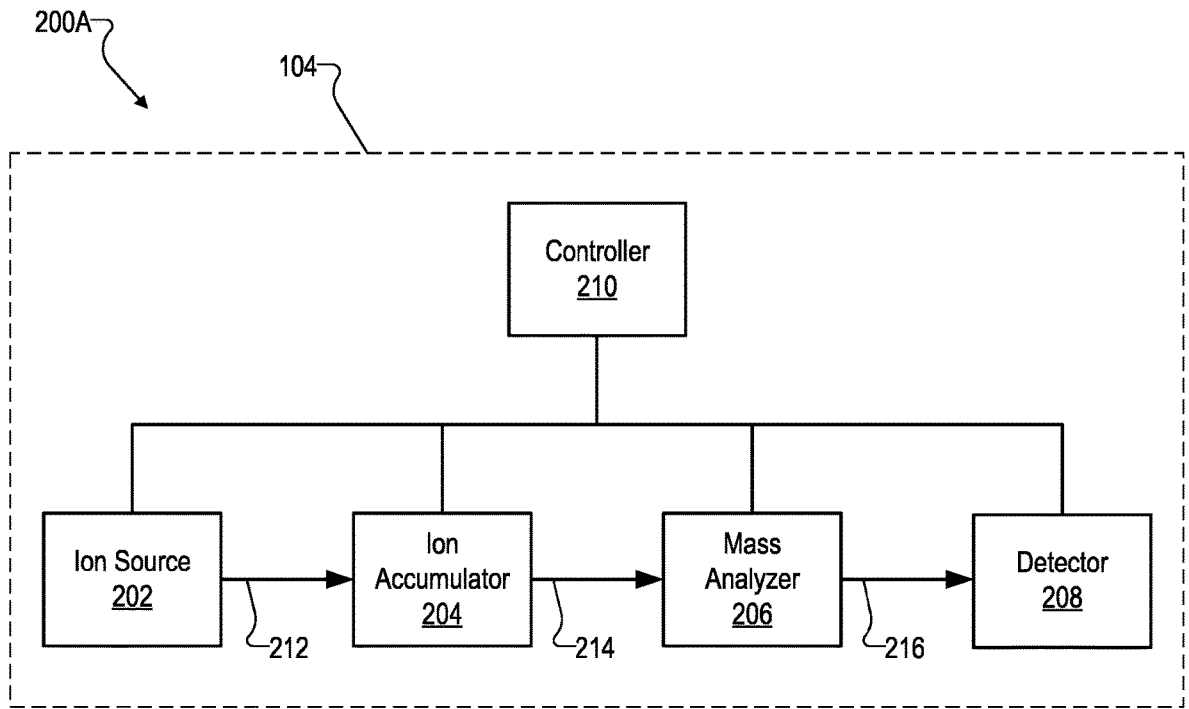
FIG. 2A shows an illustrative implementation of the mass spectrometer of FIG. 1 including an ion accumulator.

Mass spectrometer 104 may be implemented by any suitable mass spectrometer. FIG. 2A shows a functional diagram of a first illustrative implementation 200A of mass spectrometer 104. As shown, mass spectrometer 104 includes an ion source 202, an ion accumulator 204, a mass analyzer 206, a detector 208, and a controller 210. Mass spectrometer 104 may further include any additional or alternative components not shown as may suit a particular implementation (e.g., ion optics, filters, ion storage devices, ion mobility analyzers, etc.).

Ion source 202 is configured to produce a stream of ions 212 from the components eluting from liquid chromatograph 102 and deliver ion stream 212 to ion accumulator 204. Ion source 202 may use any suitable ionization technique, including without limitation electron ionization, chemical ionization, matrix assisted laser desorption/ionization, electrospray ionization, atmospheric pressure chemical ionization, atmospheric pressure photoionization, inductively coupled plasma, and the like. Ion source 202 may include various components for producing ions from components included in sample 108 and delivering the ions to ion accumulator 204.

Ion accumulator 204 is a device configured to accumulate, over an accumulation time, ions included in ion stream 212. In some examples, ion accumulator 204 is an ion storage device configured to buffer down-stream processes, such as mass analysis, thereby increasing scan speed and instrument sensitivity. In some examples, ion accumulator 204 is a beam-type device or a trapping device, such as a multipole ion guide (e.g., a quadrupole ion guide, a hexapole ion guide, an octapole ion guide, etc.), a linear quadrupole ion trap, a three-dimensional quadrupole ion trap, a cylindrical ion trap, a toroidal ion trap, an orbital electrostatic trap, a Kingdon trap, and the like. The accumulation of ions in ion accumulator 204 may be regulated with the aim to achieve a target number of ions in ion accumulator 204. Regulation of the accumulation of ions in ion accumulator 204 may be performed by a gate apparatus (not shown) that either transmits or blocks ion stream 212. Using estimates of the ion flux of ion stream 212 (e.g., quantity of ions (as measured by intensity) per unit time), as will be described below in more detail, the gate may be opened for a given amount of time to meter the appropriate number of ions, after which the gate is closed. The accumulated ions may then be transferred as ion stream 214 from ion accumulator 204 to mass analyzer 206.

Mass analyzer 206 is configured to separate ions in ion stream 214 according to m/z of each of the ions to filter and/or perform a mass analysis of the ions and frequently provide an ion stream 216 to detector 208. Mass analyzer 206 may be implemented by any suitable beam-type or trapping-type mass analyzer, such as a quadrupole mass filter, an ion trap (e.g., a linear quadrupole ion trap, a three-dimensional quadrupole ion trap, a cylindrical ion trap, a toroidal ion trap, etc.), a time-of-flight (TOF) mass analyzer, an electrostatic trap mass analyzer (e.g. an orbital electrostatic trap such as an Orbitrap mass analyzer, a Kingdon trap, etc.), a Fourier transform ion cyclotron resonance (FT-ICR) mass analyzer, a sector mass analyzer, and the like.

In some examples, mass spectrometer 104 is a tandem mass spectrometer (tandem-in-time or tandem-in-space) configured to perform tandem mass spectrometry (e.g., MS/MS), a multi-stage mass spectrometer configured to perform multi-stage mass spectrometry (also denoted MS"), or a hybrid mass spectrometer. For example, mass analyzer 206 may include multiple mass analyzers, mass filters, and/or collision cells. The term "collision cell," as used herein, may include any structure arranged to produce product ions via controlled dissociation processes or ion-ion reaction processes and is not limited to devices employed for collisionally-activated dissociation. For example, a collision cell may be configured to fragment the ions using collision induced dissociation (CID), electron transfer dissociation (ETD), electron capture dissociation (ECD), photo induced dissociation (PID), surface induced dissociation (SID), and the like. A collision cell may be positioned upstream from a mass filter, which separates the fragmented ions based on the ratio of mass to charge of the ions. In some embodiments, mass analyzer 206 may include a combination of multiple mass filters and/or collision cells, such as a triple quadrupole mass analyzer, where a collision cell is interposed in the ion path between independently operable mass filters.

While FIG. 2A shows that ion accumulator 204 is positioned upstream from mass analyzer 206, ion accumulator 204 may be positioned at any other location along an ion path from ion source 202 to detector 208 within a tandem mass spectrometer or multi-stage mass spectrometer (e.g., between a first mass filter (Q1) and a collision cell (Q2) and/or between a collision cell (Q2) and a second mass filter (Q3)). Additionally, mass spectrometer 104 may include more than one ion accumulator 204, such as when mass spectrometer 104 is a tandem mass spectrometer or multi-stage mass spectrometer.

Ion detector 208 is configured to detect ions either within the mass analyzer 206 or in ion stream 216 from the mass analyzer 206 at each of a variety of different m/z and responsively generate an electrical signal representative of ion intensity. The electrical signal is transmitted to controller 210 for processing, such as to construct a mass spectrum of the detected ions. For example, mass analyzer 206 may emit an emission beam of separated ions to detector 208, which is configured to detect the ions in the emission beam and generate or provide data that can be used by controller 210 to construct a mass spectrum. Ion detector 208 may be implemented by any suitable detection device, including without limitation an electron multiplier, a Faraday cup, and the like.

Controller 210 may be communicatively coupled with, and configured to control various operations of, mass spectrometer 104. For example, controller 210 may be configured to control operation of various hardware components included in ion source 202, ion accumulator 204, mass analyzer 206, and/or detector 208. To illustrate, controller 210 may be configured to control an accumulation time of ion accumulator 204 and/or mass analyzer 206, control an oscillatory voltage power supply and/or a DC power supply to supply an RF voltage and/or a DC voltage to mass analyzer 206, adjust values of the RF voltage and DC voltage to select an effective m/z (including a mass tolerance window) for analysis, and adjust the sensitivity of ion detector 208 (e.g., by adjusting the detector gain).

Controller 210 may also include and/or provide a user interface configured to enable interaction between a user of mass spectrometer 104 and controller 210. The user may interact with controller 210 via the user interface by tactile, visual, auditory, and/or other sensory type communication. For example, the user interface may include a display device (e.g., liquid crystal display (LCD) display screen, a touch screen, etc.) for displaying information (e.g., mass spectra, notifications, etc.) to the user. The user interface may also include an input device (e.g., a keyboard, a mouse, a touchscreen device, etc.) that allows the user to provide input to controller 210. In other examples the display device and/or input device may be separate from, but communicatively coupled to, controller 210. For instance, the display device and the input device may be included in a computer (e.g., a desktop computer, a laptop computer, a mobile device, etc.) communicatively connected to controller 210 by way of a wired connection (e.g., by one or more cables) and/or a wireless connection (e.g., Wi-Fi, Bluetooth, near-field communication, etc.).

Controller 210 may include any suitable hardware (e.g., a processor, circuitry, etc.) and/or software as may serve a particular implementation. While FIG. 2A shows that controller 210 is included in mass spectrometer 104, controller 210 may alternatively be implemented in whole or in part separately from mass spectrometer 104, such as by a computing device communicatively coupled to mass spectrometer 104 by way of a wired connection (e.g., a cable) and/or a network (e.g., a local area network, a wireless network (e.g., Wi-Fi), a wide area network, the Internet, a cellular data network, etc.). In some examples, controller 210 may be implemented in whole or in part by controller 106 (and vice versa).

Figure 2B:
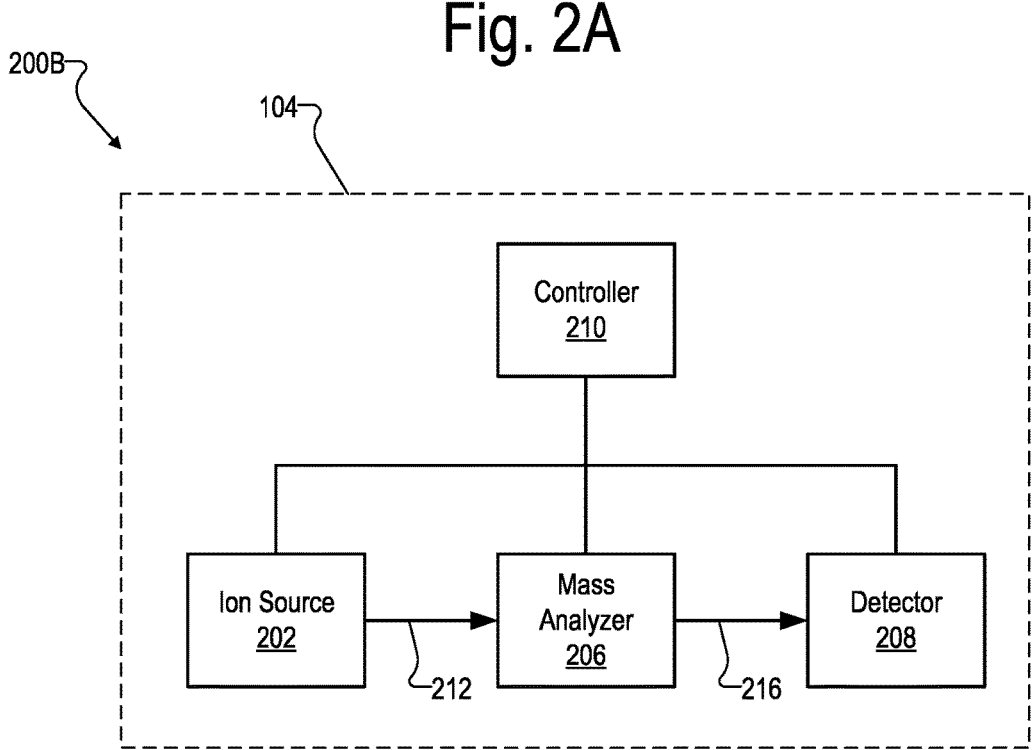
FIG. 2B shows another illustrative implementation of the mass spectrometer of FIG. 1 including a trapping-type mass analyzer.

FIG. 2B shows a functional diagram of another illustrative implementation 200B of mass spectrometer 104. Implementation 200B is similar to implementation 200A except that, in implementation 200B, mass analyzer 206 is a trapping-type mass analyzer and ion accumulator 204 and ion stream 214 from ion accumulator 204 are omitted. Ions are accumulated in mass analyzer 206 over an accumulation time to achieve a target number of ions in mass analyzer 206.

Referring again to FIG. 1, controller 106 may be communicatively coupled with, and configured to control operations of, LC-MS system 100 (e.g., liquid chromatograph 102 and/or mass spectrometer 104). Controller 106 may include any suitable hardware (e.g., a processor, circuitry, etc.) and/or software configured to control operations of and/or interface with the various components of LC-MS system 100 (e.g., liquid chromatograph 102 and/or mass spectrometer 104).

For example, controller 106 may be configured to acquire data acquired over time by liquid chromatograph 102 and mass spectrometer 104. The data may include a series of mass spectra including intensity values of ions produced from the components of sample 108 as a function of m/z of the ions. The data may be represented in a three-dimensional map in which time (e.g., retention time) is plotted along an x-axis, m/z is plotted along a y-axis, and intensity is plotted along a z-axis. Spectral features on the map (e.g., peaks of intensity) represent detection by LC-MS system 100 of ions produced from various components included in sample 108. The x-axis and z-axis of the map may be used to generate a mass chromatogram that plots intensity as a function of time for a selected m/z (e.g., an extracted ion chromatogram (XIC)) or for a full m/z spectrum (e.g., a total ion current (TIC)). As used herein, a "selected m/z" may include a specific m/z with or without a mass tolerance window or a narrow range of m/z. The y-axis and z-axis of the map may be used to generate mass spectra, each mass spectrum plotting intensity as a function of m/z for a particular acquisition (e.g., for each MS scan or MS/MS scan).

Figure 3:
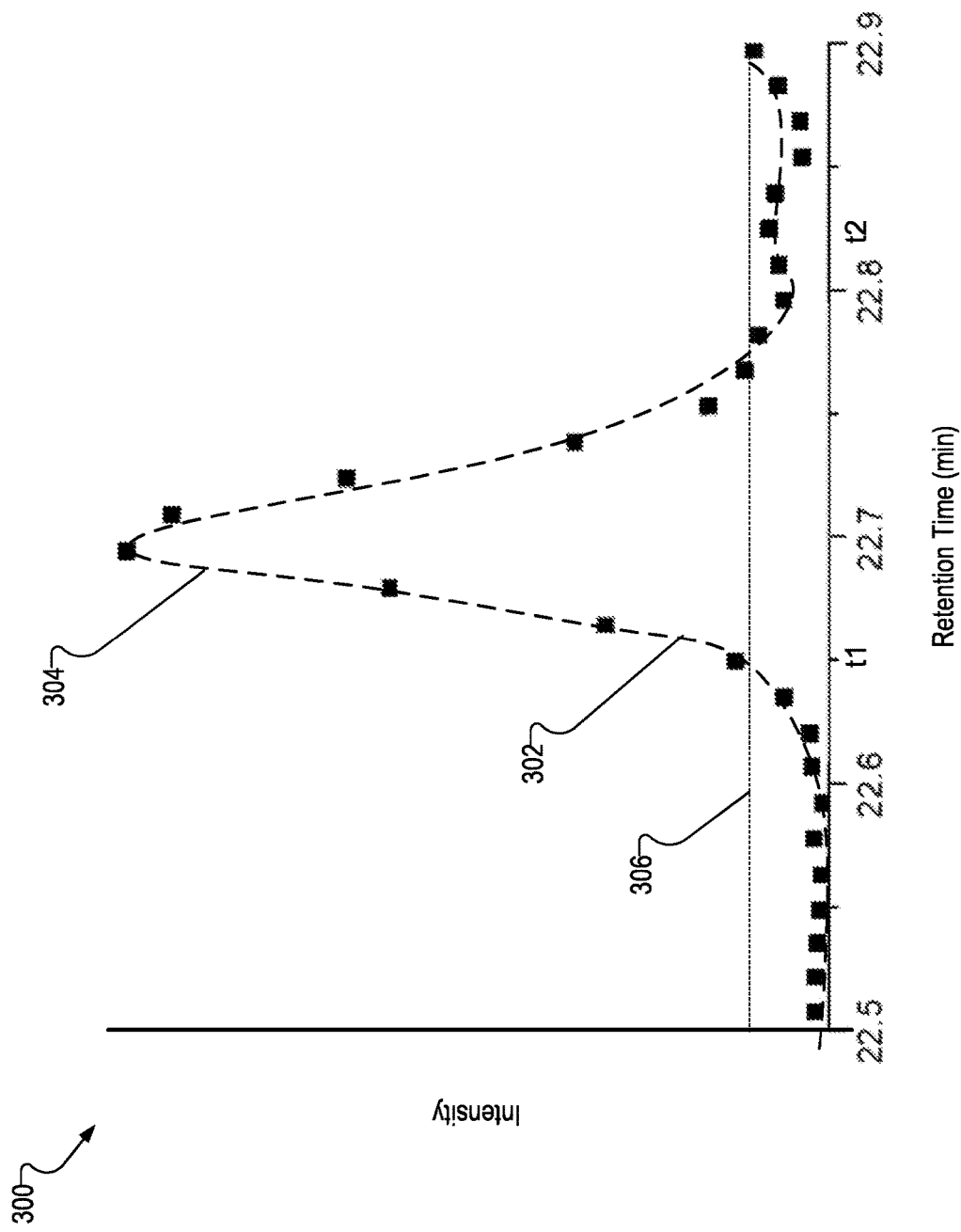
FIG. 3 shows an illustrative elution profile (e.g., a total ion current (TIC) chromatogram) of ions produced from components included in a sample as the components elute from the liquid chromatograph of FIG. 1.

FIG. 3 shows a portion of an illustrative mass chromatogram 300 (e.g., a TIC or an XIC) of ions derived from one or more components included in sample 108 and that elute from liquid chromatograph 102. Mass chromatogram 300 is generated from data acquired by mass spectrometer 104, such as a plurality of survey acquisitions (e.g., MS full-spectrum prescans) or analytical acquisitions (e.g., MS or MS/MS scans). Mass chromatogram 300 plots intensity (arbitrary units) as a function of retention time (in minutes). As shown, mass chromatogram 300 includes a plurality of detection points, each acquired from a different acquisition, that together form an elution profile 302 (as indicated by the dashed line curve). As the components elute from column 110, the detected intensity of the ions produces a peak 304 having a roughly Gaussian profile. However, peak 304 and/or other peaks (not shown) in elution profile 302 may have other, non-Gaussian profiles.

Conventional AGC methods for regulating ion population in an ion storage device or mass analyzer assume that the ion flux (quantity (e.g., intensity) of ions per unit time) will remain constant for the next acquisition and thus set the accumulation time based on the ion flux of the prior acquisition. However, as shown in FIG. 3 the ion flux during an LC-MS experiment is not constant but is dynamic and, at times, fast-changing as the components elute from the column. Hence, the conventional AGC methods overshoot the accumulation time during which ions are accumulated (and, hence, overshoot the target number of ions) while the peak intensity is increasing and undershoot the accumulation time (and, hence, undershoot the target number of ions) while the peak intensity is decreasing.

An improved method of regulating ion population accounts for the dynamic and fast-changing nature of the ion flux by predicting the next detection point to be acquired in an elution profile (e.g., a TIC) based on a set of historic detection points (e.g., a set of most recent detection points) The predicted next detection point may be determined by applying the set of historic detection points to a machine learning model that was trained to determine a predicted next detection point. The accumulation time for the next acquisition may be set based on the intensity of the predicted next detection point. For example, the accumulation time for a next acquisition may be determined as the target number of ions to be accumulated divided by the predicted ion flux of the next acquisition. Systems and methods for determining a predicted next detection point and setting the accumulation time based on the predicted next detection point are described below in more detail.

A predicted next detection point in an elution profile (e.g., an XIC) may also be used to perform a DDA experiment. In a conventional DDA experiment, a data-dependent acquisition (e.g., an MS/MS scan) of a component is triggered when elution of the component is detected. As shown in FIG. 3, elution of the component is detected at a time when the detected intensity value has just risen above a predetermined minimum threshold intensity value (indicated by a dashed line 306), which typically occurs at the start of peak 304 and while the intensity value is relatively weak. Dynamic exclusion may be applied during a time window so that a data-dependent acquisition is not performed for the selected m/z during the time window. To maximize the probability of matching the MS/MS spectra to a known component when the data-dependent acquisition is triggered early in peak 304, longer ion accumulation times are required at the mass analyzer to produce a stronger MS/MS signal for each selected m/z. However, longer ion accumulation times results in slower MS/MS acquisitions. As a result, fewer components of different selected m/z can be analyzed by MS/MS.

These issues may be addressed by triggering a data-dependent acquisition (e.g., an MS/MS scan) for the selected m/z when the detected intensity value is at or near the apex of peak 304. However, determining whether the selected m/z is at or near apex of peak 304 is a challenging signal processing problem. Previous attempts to solve the problem treated survey acquisition signals for each selected m/z as sine waves. With this technique, a Fourier analysis is performed on the data so that each point is assigned a frequency and phase value. When the phase falls within a certain range of values corresponding to the apex of the elution profile peak, a data-dependent action can be taken. This procedure theoretically works well, but produces random results with real, noisy data. A better method is needed to initiate a data-dependent action at or near the apex of an elution profile peak for a selected m/z.

An improved method of performing tandem mass spectrometry includes detecting, based on a most-recently acquired mass spectrum (e.g., a survey mass spectrum) included in a series of mass spectra, precursor ions having a selected m/z; determining, based on (e.g., in response to) the detection of the precursor ions, the predicted next detection point in an elution profile (e.g., XIC) for the selected m/z; and performing, based on the predicted next detection point, a DDA of product ions produced from the detected precursor ions. Systems and methods for determining a predicted next detection point and performing a DDA based on the predicted next detection point are described below in more detail.

Figure 4:
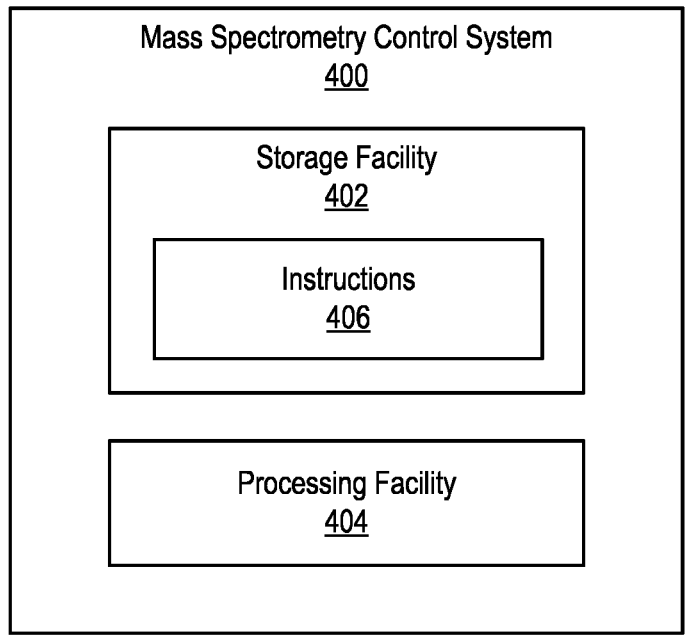
FIG. 4 shows an illustrative mass spectrometry control system configured to determine a predicted next detection point of an elution profile.

One or more operations associated with improved methods of ion population regulation and improved methods of performing tandem mass spectrometry may be performed by a mass spectrometry control system. FIG. 4 shows an illustrative mass spectrometry control system 400 ("system 400"). System 400 may be implemented entirely or in part by LC-MS system 100 (e.g., by controller 106 and/or controller 210). Alternatively, system 400 may be implemented separately from LC-MS system 100 (e.g., a remote computing system or server).

System 400 may include, without limitation, a storage facility 402 and a processing facility 404 selectively and communicatively coupled to one another. Facilities 402 and 404 may each include or be implemented by hardware and/or software components (e.g., processors, memories, communication interfaces, instructions stored in memory for execution by the processors, etc.). In some examples, facilities 402 and 404 may be distributed between multiple devices and/or multiple locations as may serve a particular implementation.

Storage facility 402 may maintain (e.g., store) executable data used by processing facility 404 to perform any of the operations described herein. For example, storage facility 402 may store instructions 406 that may be executed by processing facility 404 to perform any of the operations described herein. Instructions 406 may be implemented by any suitable application, software, code, and/or other executable data instance.

Storage facility 402 may also maintain any data acquired, received, generated, managed, used, and/or transmitted by processing facility 404. For example, storage facility 402 may maintain LC-MS data (e.g., acquired chromatogram data and/or mass spectra data) and/or model data. Model data may include data representative of, used by, or associated with one or more models (e.g., machine learning models) and/or algorithms maintained by processing facility 404 for determining a predicted next detection point in an elution profile.

Processing facility 404 may be configured to perform (e.g., execute instructions 406 stored in storage facility 402 to perform) various processing operations described herein. It will be recognized that the operations and examples described herein are merely illustrative of the many different types of operations that may be performed by processing facility 404. In the description herein, any references to operations performed by system 400 may be understood to be performed by processing facility 404 of system 400. Furthermore, in the description herein, any operations performed by system 400 may be understood to include system 400 directing or instructing another system or device to perform the operations.

Figure 5:
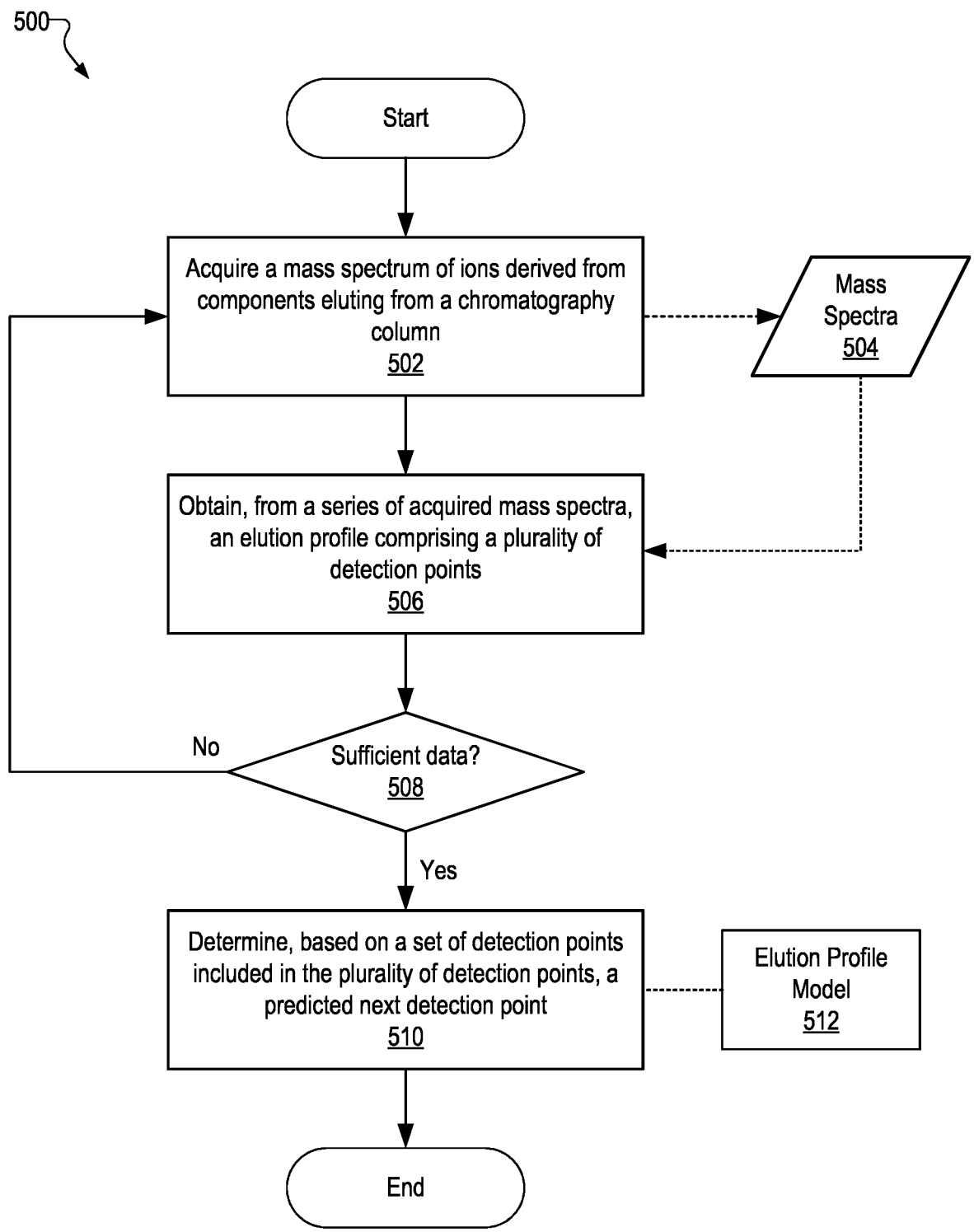
FIG. 5 shows an illustrative method of determining a predicted next detection point of an elution profile.

FIG. 5 shows an illustrative method 500 of determining a predicted next detection point in an elution profile. While FIG. 5 shows illustrative operations according to one embodiment, other embodiments may omit, add to, reorder, and/or modify any of the operations shown in FIG. 5. One or more of the operations shown in FIG. 5 may be performed by LC-MS system 100 and/or system 400, any components included therein, and/or any implementations thereof (e.g., by a remote computing system separate from LC-MS system 100).

In operation 502, a mass spectrum of ions derived from components eluting from a chromatography column is acquired. Operation 502 may be performed in any suitable way. For example, mass analyzer 206 acquires a mass spectrum by performing a mass analysis of the eluting ions, such as a full-spectrum MS scan or an MS/MS prescan or analytical scan in which the detected ions are product ions. In some examples, the ions are accumulated in ion accumulator 204 and the accumulated ions are transferred to mass analyzer 206 for acquisition of the mass spectrum. In other examples, the ions are accumulated in a trapping-type mass analyzer and the mass analyzer performs a mass analysis of the accumulated ions. The mass spectrum is then stored (e.g., in storage facility 402) with a series of mass spectra 504 previously acquired (if any) and stored during the experiment. If the mass spectrum is the first mass spectrum acquired during the experiment, the mass spectrum is stored, and subsequently-acquired mass spectra may be combined with the mass spectrum to produce series of mass spectra 504. Mass spectra 504 may be acquired (e.g., accessed) by a computing system (e.g., system 400) for presentation and/or further processing, such as for determining a predicted next detection point.

In operation 506, system 400 obtains, from mass spectra 504, an elution profile including a plurality of detection points each from a different acquisition and representing intensity of the ions, as detected by mass spectrometer 104, as a function of time. Operation 506 may be performed in any suitable way. As mentioned, the intensity value of each detection point may represent the total ion current for the corresponding mass spectrum included in mass spectra 504 as a function of time. Alternatively, the intensity value of each detection point may represent the intensity for a selected m/z (e.g., a selected m/z for an analyte of interest, a selected m/z for a highest intensity analyte, etc.), such as to prevent saturation of the detector or to trigger a data-dependent acquisition of a target analyte of interest.

In operation 508, system 400 determines whether sufficient data has been acquired for a machine learning model to determine a predicted next detection point in the elution profile. Operation 508 may be performed in any suitable way. In some examples, sufficient data has been acquired when the elution profile contains a minimum or a predetermined number of detection points in the elution profile (e.g., 6, 16, 24, 48, 100, etc.). In some examples, the count of detection points is reset to zero when the detected intensity value in the elution profile returns to less than a threshold intensity value (e.g., when a peak 304 has passed) and/or when a rate of change of detected intensity is less than a threshold rate of change.

In alternative examples, system 400 determines that sufficient data has been acquired when system 400 determines that a minimum amount of time has elapsed since a reference time. The reference time may be, for example, a time of a first acquisition, a time at which sample 108 was injected to liquid chromatograph 102, or a time when instrument conditions or method parameters changed. In some examples, system 400 may determine whether the time elapsed since the reference time is greater than or equal to a sliding time window size. The sliding time window may encompass, for example, a period of 0.1 seconds, 0.5 seconds, 3 seconds, etc.

If system 400 determines that sufficient data has not been acquired, method 500 returns to operation 502 for another acquisition. In some examples in which method 500 is used for AGC for ion population regulation, system 400 performs a conventional AGC scheme, such as described herein, to regulate ion population until sufficient data has been acquired. If, however, system 400 determines that sufficient data has been acquired, method 500 proceeds to operation 510.

In alternative examples, operation 508 is omitted so that method 500 proceeds to operation 510 without regard to the quantity of data acquired. In some examples, at the start of an analysis of a target, system 400 generates an initial set of detection points by setting each detection point to a reference value or a default value (e.g., zero or a known baseline value for the particular assay or target). System 400 adds each new acquired detection point to the set and/or drops the oldest reference or default value as the analysis progresses. In this way, system 400 will always have sufficient data, although at the start of the analysis the initial set of detection points is based on default or reference detection points rather than observed detection points acquired during the analysis.

In operation 510, system 400 determines, based on a set of detection points included in the plurality of detection points of the elution profile, a predicted next detection point. Determination of the predicted next detection point of an elution profile is based on the principle that the next detection point is a function of detected intensity values of a set of recent detection points. The predicted next detection point is a detection point that is predicted to be obtained from the next mass spectrum to be acquired subsequent to the current time (e.g., subsequent to the acquisition of mass spectra 504 from which the plurality of detection points were obtained). Operation 510 may be performed in any suitable way.

In some examples, system 400 determines the predicted next detection point by applying the set of detection points to elution profile model 512. Elution profile model 512 is configured to use the set of detection points as an input to perform any suitable heuristic, process, and/or operation that may be performed or executed by system 400 to determine a predicted next detection point of the elution profile. In some examples, elution profile model 512 is implemented by hardware and/or software components (e.g., processors, memories, communication interfaces, instructions stored in memory for execution by the processors, etc.), such as storage facility 402 and/or processing facility 404 of system 400. Elution profile model 512 may include any suitable algorithm and/or machine learning model configured to determine a predicted next detection point based on intensity values for a set of recent detection points. Elution profile model 512 may determine the predicted next detection point in any suitable way. In some examples, elution profile model 512 is a machine learning model, such as a neural network (e.g., a Recurrent Neural Network (RNN), a Long Short-Term Memory (LSTM) neural network, a Gated Recurrent Unit (GRU) neural network, etc.). An illustrative machine learning model, and methods of training the machine learning model, will be described below in more detail.

In some examples, elution profile model 512 has been trained, at the time of execution of method 500, based on training data acquired during multiple different experiments performed under different sets of experiment conditions. As a result, elution profile model 512 may be used across a wide range of experiment conditions. A set of experiment conditions may specify, for example, one or more of a flow rate of the separation system (e.g., nanoflow, microflow, high flow), a gradient of the chromatography column, a list of target analytes, and/or the type of chromatography (e.g., capillary electrophoresis, liquid chromatography, gas chromatography, etc.), the type of stationary and/or mobile phase (e.g., hydrophilic interaction chromatography (HILIC), ion chromatography, C18 particles, C8 particles, etc.). In other examples, elution profile model 512 has been trained based on training data configured for a specific application, such as a selected m/z, specific experiment conditions, a specific sample type, etc. In some examples, system 400 selects, based on a set of experiment conditions for analyzing sample 108, elution profile model 512 from among a plurality of machine learning models each trained for a particular set of experiment conditions.

In some examples in which the elution profile data does not evenly space the plurality of detection points (e.g., see detection points 602 in FIG. 6) along the time axis, system 400 may adjust the plurality of detection points (or just the detection points of a set of recent detection points), such as by interpolation, to a uniform time spacing (e.g., 1 second) to simplify processing by elution profile model 512. The output provided by elution profile model 512 may then be interpolated or otherwise adjusted based on the sampling rate of the mass analyzer to determine the predicted next detection point for the next mass spectrum to be acquired.

To further simplify processing by elution profile model 512, system 400 may additionally or alternatively normalize the detection points (or just the detection points of a set of recent detection points) to a reference intensity value. Any normalization scheme may be used, and any reference intensity value may be used, such as a known running average intensity value of the elution profile, a global maximum intensity value of the elution profile, a recent maximum intensity value, etc.

Operation 510 will now be described with reference to FIG. 6, which shows an illustrative TIC 600 that may be generated from, or is representative of, series of mass spectra 504, and FIG. 7, which shows TIC 600 after data from an additional acquisition have been added to TIC 600. TIC 600 will facilitate description of operation 510, but operation 510 may be performed with raw source data without generating TIC 600.

TIC 600 plots a plurality of detection points 602 each representing a detected intensity value (arbitrary units), as detected by mass spectrometer 104 during a prescan or analytical acquisition, as a function of retention time (in minutes). Detection points 602 have been interpolated to a uniform time spacing (approximately 1.1 seconds) to simplify processing by elution profile model 512. Each successive acquisition of a mass spectrum (operation 502) adds a new detection point 602 to TIC 600. Detection points 602 together form an elution profile of the components eluting from column 110. As shown on TIC 600, the right-most detection point 602-C is a current (most-recent) detection point 602 obtained from a mass spectrum acquired at current time $t_C$. The upward trajectory of intensity values of the most recent detection points 602 indicates the start of a peak 604 in the expected elution profile. In FIG. 6, the expected elution profile is represented by a dashed-line curve.

To determine the predicted next detection point (operation 510), system 400 selects a set 606 of detection points 602 in the elution profile and applies set 606 to elution profile model 512. In the example of FIG. 6, set 606 includes a consecutive sequence of n detection points 602 concluding with current detection point 602-C. While FIG. 6 shows that n is ten, n may be any other number of detection points 602 (e.g., 6, 16, 24, 35, 64, etc.), and may be selected to ensure elution profile model 512 has sufficient data to determine the predicted next detection point. In further examples, once n detection points have been acquired, each set 606 may include all detection points 602 included in one or more prior sets 606. In alternative examples, the sequence of detection points 602 in set 606 is not consecutive, but may be some other grouping (e.g., every other detection point 602, every two of three detection points 602, a random selection of detection points 602, etc.). In other examples, set 606 includes only the detection points 602 that occur within a sliding time window concluding with the current time $t_C$. For example, the sliding time window may encompass a period of 0.1 seconds, 0.5 seconds, 3 seconds, etc.

System 400 determines, based on elution profile model 512 and set 606, the predicted next detection point 608 (indicated by an open circle). In FIG. 6, predicted next detection point 608 is a detection point that is predicted, by system 400, to be obtained from the next mass spectrum to be acquired subsequent to the current time $t_C$ (e.g., subsequent to the acquisition of mass spectra 504 from which detection points 602 were obtained). If predicted next detection point 608 does not align with a timing of the next mass spectrum, predicted next detection point 608 may then be adjusted by interpolation based on a sampling rate of the mass analyzer.

System 400 may repeat the process after the next mass spectrum has been acquired and the acquired next detection point has been added to the elution profile. For example, with reference to FIG. 7, system 400 selects another set 702 of detection points 602 in the elution profile and applies set 702 to elution profile model 512 to determine the predicted next detection point 704. As shown, set 702 has dropped the oldest detection point of set 606 and has added the newest detection point 602 (detection point 602-C). System 400 may repeat the process after each subsequent acquisition, or until manually or automatically terminated.

Figure 6:
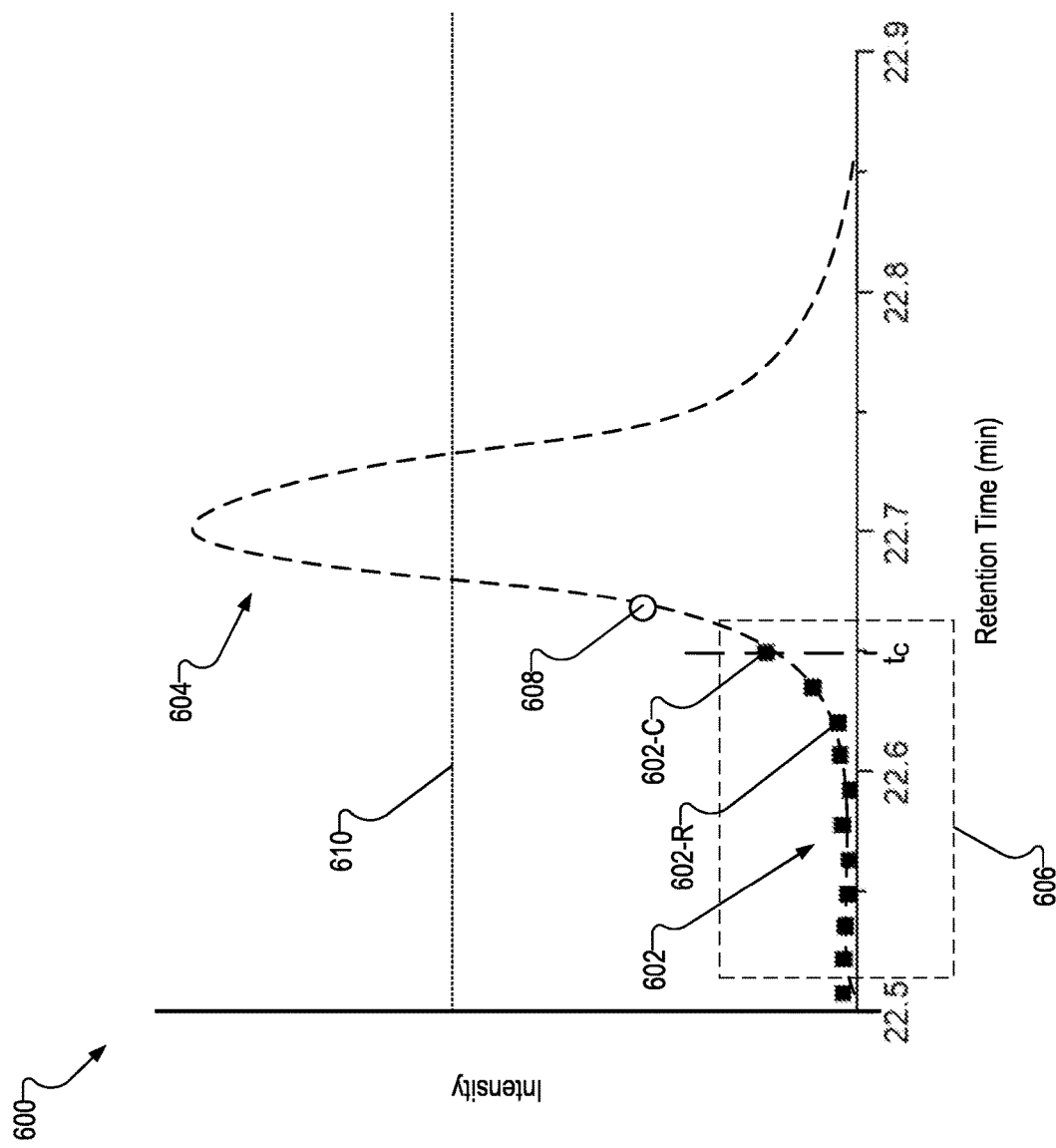
FIG. 6 shows an illustrative TIC including an elution profile that may be generated from, or is representative of, a series of mass spectra acquired by the LC-MS system of FIG. 1 and that includes a plurality of detection points.
Figure 7:
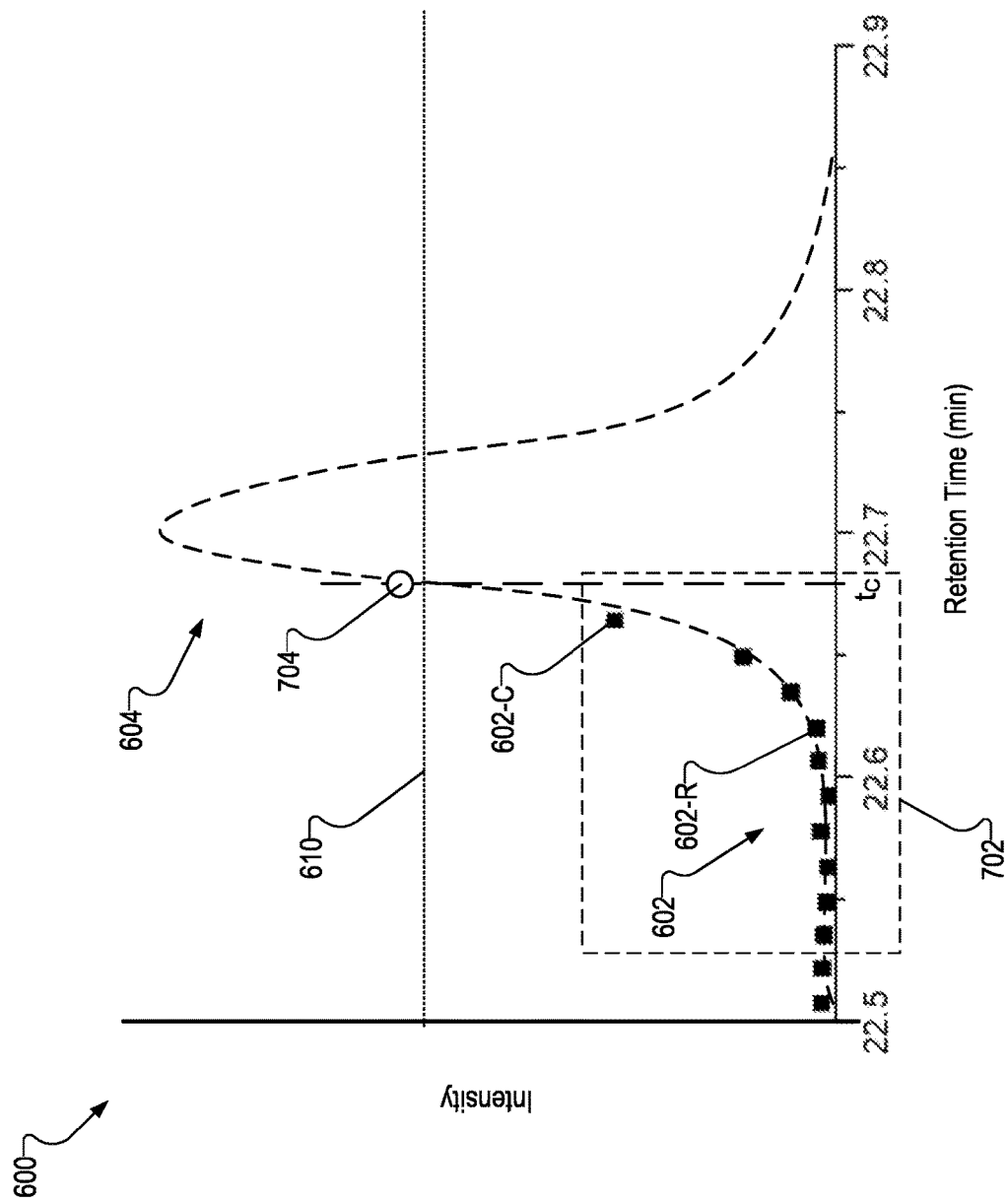
FIG. 7 shows the illustrative TIC of FIG. 6 after two additional detection points have been acquired.

While the elution profile shown in FIGS. 6 and 7 has been described as a TIC, the elution profile shown may alternatively represent an XIC for a selected m/z. In an XIC, the detection points together form an elution profile of ions having a selected m/z eluting from column 110.

Figure 8:
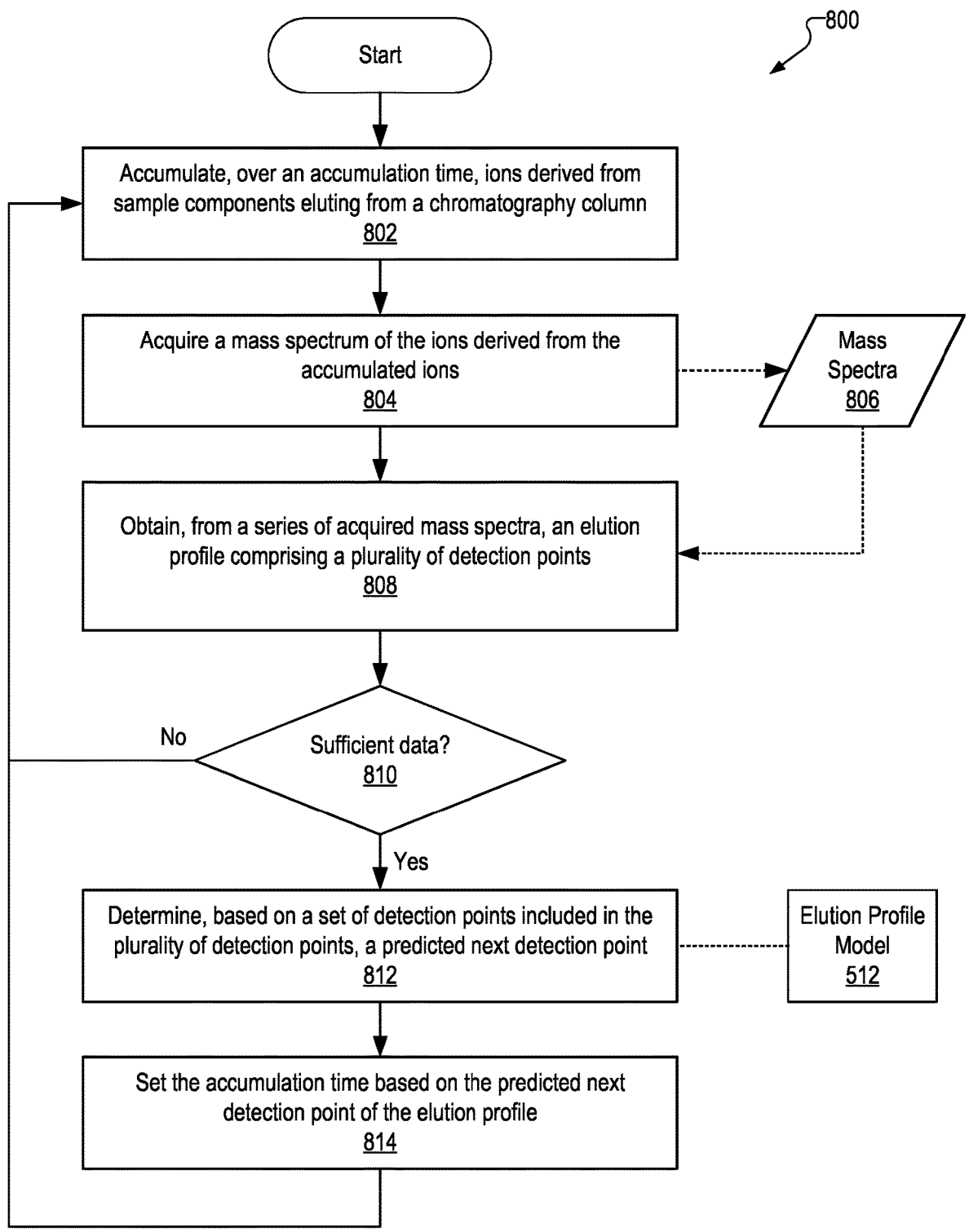
FIG. 8 shows an illustrative method of performing ion population regulation based on a predicted next detection point of an elution profile.

FIG. 8 shows an illustrative method 800 of using a predicted next detection point for ion population regulation. While FIG. 8 shows illustrative operations according to one embodiment, other embodiments may omit, add to, reorder, and/or modify any of the operations shown in FIG. 8. One or more of the operations shown in FIG. 8 may be performed by LC-MS system 100 and/or system 400, any components included therein, and/or any implementations thereof (e.g., by a remote computing system separate from LC-MS system 100).

In operation 802, ions produced from the sample components eluting from column 110 are accumulated over an accumulation time. Operation 802 may be performed in any suitable way. For example, the ions may be accumulated in an accumulation device, such as ion accumulator 204 or mass analyzer 206 (e.g., a trapping-type device). The accumulation time may be initially set to a default or baseline accumulation time configured to produce a target population of accumulated ions. The target population of accumulated ions may be based, for example, on characteristics of ion accumulator 204, mass analyzer 206, and/or detector 208, such as storage space charge capacity and/or spectral space charge capacity. In some examples, the initial value of the accumulation time may be set manually by a user (e.g., by way of controller 106 or controller 210). In further examples, the initial value of accumulation time may be set automatically by system 400, such as based on a default value, based on method parameters for the particular method or assay, based on characteristics of ion accumulator 204, mass analyzer 206 or detector 208, and/or based on information provided by the user (e.g., based on a number of target analytes, etc.). The initial value of accumulation time may be set so as to prevent overshooting and undershooting the target number of ions.

In operation 804, a mass spectrum of ions derived from the accumulated ions is acquired and is stored (e.g., in storage facility 402) with a series of mass spectra 806 previously acquired and stored during the experiment. Operation 804 may be performed in any suitable manner, including in the same or a similar manner as operation 502 of method 500. If the mass spectrum is the first mass spectrum acquired during the experiment, the mass spectrum is stored and subsequently-acquired mass spectra are combined with the mass spectrum to produce a series of mass spectra 806.

In operation 808, system 400 obtains, from the series of mass spectra 806, an elution profile including a plurality of detection points each from a different acquisition and representing intensity of the ions, as detected by a mass spectrometer, as a function of time. Operation 808 may be performed in any suitable manner, including in the same or a similar manner as operation 506 described herein.

In operation 810, system 400 determines whether sufficient data has been acquired. Operation 810 may be performed in any suitable manner, including in the same or a similar manner as operation 508 of method 500. If system 400 determines that sufficient data has not been acquired, method 800 returns to operation 802 for another acquisition. If, however, system 400 determines that sufficient data has been acquired, method 800 proceeds to operation 812. In alternative examples, operation 810 is omitted so that method 800 proceeds to operation 812 without regard to the quantity of data acquired.

In operation 812, system 400 determines, based on elution profile model 512 and a set of detection points included in the plurality of detection points, a predicted next detection point of the elution profile. Operation 812 may be performed in any suitable manner, including in the same or a similar manner as operation 510 described herein.

In operation 814, system 400 sets the accumulation time based on the predicted next detection point determined in operation 812. Operation 814 may be performed in any suitable way. For example, system 400 may estimate, based on the predicted next detection point (e.g., based on the intensity of the predicted next detection point), a predicted ion flux of the ions produced from the components eluting from the chromatography column during the acquisition of the next mass spectrum. System 400 may determine the accumulation time for the acquisition of the next mass spectrum as the target population of ions divided by the predicted ion flux during the acquisition of the next mass spectrum. The target population of ions is previously determined, as explained above, based on characteristics of the device (e.g., space charge capacity), experiment conditions, and/or method parameters.

After operation 814, the processing of method 800 returns to operation 802 for another acquisition with the accumulation time set in operation 814. Method 800 may continue until it is automatically or manually terminated.

By setting the accumulation time based on the predicted next detection point, the target population of ions may be accumulated with a high degree of accuracy (e.g., without significantly overfilling or underfilling the accumulation device), even with a dynamic and fast-changing elution profile.

Figure 9:
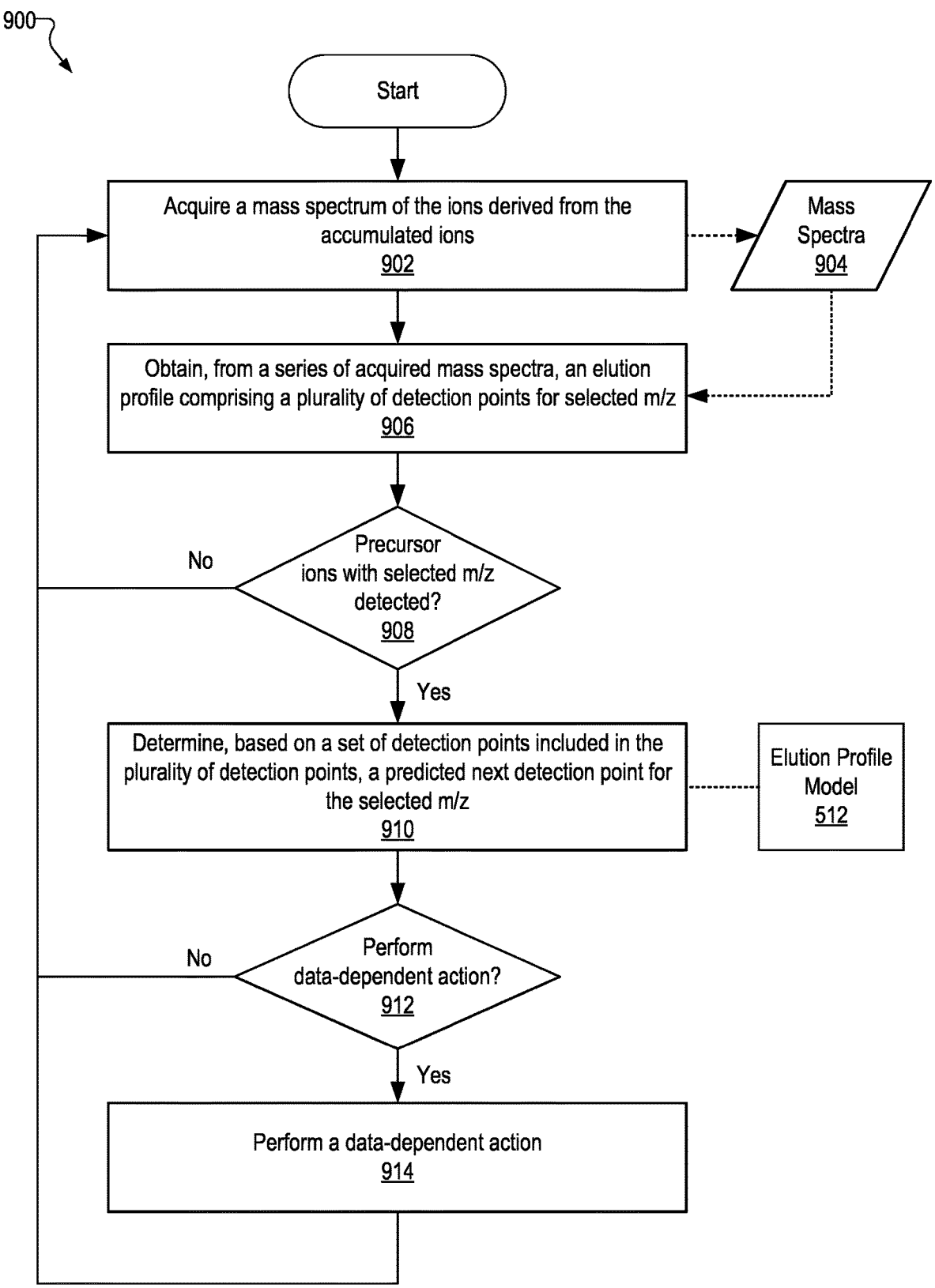
FIG. 9 shows an illustrative method of performing tandem mass spectrometry based on a predicted next detection point.

FIG. 9 shows an illustrative method 900 of using a predicted next detection point for performing tandem mass spectrometry. While FIG. 9 shows illustrative operations according to one embodiment, other embodiments may omit, add to, reorder, and/or modify any of the operations shown in FIG. 9. One or more of the operations shown in FIG. 9 may be performed by LC-MS system 100 and/or system 400, any components included therein, and/or any implementations thereof.

In operation 902, a mass spectrum of ions derived from components eluting from a chromatography column is acquired. Operation 902 may be performed in any suitable way, including any way described herein (e.g., in a manner similar to operation 502 of method 500). For example, mass analyzer 206 may perform a mass analysis of the ions, such as a full-spectrum MS scan or survey scan. The mass spectrum is stored (e.g., in storage facility 402) with a series of mass spectra 904 previously acquired (if any) and stored during the experiment. If the mass spectrum is the first mass spectrum acquired during the experiment, the mass spectrum is stored and subsequently-acquired mass spectra may be combined with the mass spectrum to produce series of mass spectra 904 (e.g., by a remote computing system separate from LC-MS system 100).

In operation 906, system 400 obtains, from the series of mass spectra 904, an elution profile (e.g., an XIC) including a plurality of detection points each from a different acquisition and representing intensity of a selected m/z as a function of time. The selected m/z may be the m/z of precursor ions derived from a particular component of interest included in sample 108. Operation 906 may be performed in any suitable manner, including in the same or a similar manner as operation 506 described herein.

In operation 908, system 400 determines, based on the series of mass spectra 904, whether precursor ions of the selected m/z are detected. Operation 908 may be performed in any suitable way. For example, system 400 may detect a peak in the elution profile and/or determine that the detected intensity reaches or exceeds a threshold level and thus determine that precursor ions of the selected m/z are detected.

If system 400 determines that precursor ions of the selected m/z are not detected, processing of method 900 returns to operation 902 for another acquisition. If, however, system 400 determines that precursor ions of the selected m/z are detected, processing of method 900 proceeds to operation 910.

In operation 910, system 400 determines, based on elution profile model 512 and a set of detection points included in the plurality of detection points, a predicted next detection point of the elution profile. Operation 910 may be performed in any suitable manner, including in the same or a similar manner as operation 510 described herein.

In operation 912, system 400 determines, based on the predicted next detection point, whether a data-dependent action is to be performed. Operation 912 may be performed in any suitable way. In some examples, system 400 compares the intensity value of the predicted next detection point (the "predicted intensity value") with a threshold intensity value. The threshold intensity value may be any suitable intensity value, such as a value that indicates an apex of a detected peak of the elution profile. If system 400 determines that the predicted intensity value of the selected m/z exceeds the threshold intensity value, system 400 determines that a data-dependent action is to be performed. If system 400 determines that the predicted intensity value of the selected m/z does not exceed the threshold intensity value, system 400 determines that a data-dependent action is not to be performed.

In further examples, system 400 compares a predicted next detection point ratio with a threshold ratio value. The predicted next detection point ratio is a ratio of the predicted intensity value to the intensity value of the current detection point or some other fixed reference detection point, such as a baseline level detection point prior to the start of the peak. The threshold ratio value may be any suitable value configured to indicate that an apex of a detected peak of the elution profile is near or that the intensity value is rapidly changing (increasing). If system 400 determines the predicted next detection point ratio does not exceed the threshold ratio value, system 400 determines that a data-dependent action is not to be performed, and processing of method 900 returns to operation 902 for another acquisition. If system 400 determines that the predicted next detection point ratio exceeds the threshold ratio value, system 400 determines that a data-dependent action is to be performed and processing of method 900 proceeds to operation 914 to perform a data-dependent action.

In operation 914, a data-dependent action is performed. Any suitable data-dependent action may be performed. In some examples, a data-dependent action is a data-dependent acquisition (e.g., an MS/MS acquisition or a multi-stage MS" acquisition) of product ions derived from the detected precursor ions of the selected m/z. For example, a data-dependent acquisition for the selected m/z may be immediately performed for the next acquisition.

In some examples, the data-dependent action is a scheduling action. For example, system 400 may schedule a future performance of a data-dependent acquisition in response to a determination that the predicted intensity value exceeds a minimum threshold value but is less than a maximum threshold value. If the predicted intensity value exceeds the maximum threshold value, system 400 may initiate an immediate performance of a data-dependent acquisition.

An illustrative embodiment of performing a data-dependent acquisition based on the predicted intensity value will now be explained with reference to FIGS. 6 and 7. In FIG. 6, the predicted next detection point 608 has a predicted intensity value less than a threshold intensity value 610 (indicated by dashed line). As a result, a data-dependent acquisition is not performed. In FIG. 7, the predicted intensity value of predicted next detection point 704 is greater than the threshold intensity value 610. As a result, a data-dependent acquisition is performed.

In an alternative illustrative embodiment, system 400 may determine that the ratio of intensity of predicted next detection point 608 to a reference detection point 602-R in FIG. 6 is less than a threshold ratio level. As a result, a data-dependent acquisition is not performed for the next acquisition and/or is scheduled at a future time (e.g., two acquisitions later). On the other hand, system 400 may determine that the ratio of the predicted intensity value of predicted next detection point 704 to the reference detection point 602-R in FIG. 7 is greater than a threshold ratio level. As a result, a data-dependent acquisition is performed for the next acquisition.

By performing a data-dependent acquisition based on a predicted next detection point, the data-dependent acquisition may be performed when the intensity of the ions produced from the component of interest are at or near the apex of the elution profile. As a result, a relatively short ion accumulation time may be set for the data-dependent acquisition and a greater number of data-dependent acquisitions may be acquired. That is, the limit of detection of components included in the sample is improved because there is a maximum amount of time that may be spent accumulating ions for an analysis, limited on the upper end by the width of the elution peak and the capacity of the ion storage device. If an MS/MS mass spectrum is acquired when the flux of the ions is higher, a higher quality mass spectrum with higher signal-to-noise ratio can be acquired in a shorter amount of time.

In alternative implementations of method 900, operation 912 is omitted so that method 900 proceeds to operation 914 from operation 910 so that system 400 performs a data-dependent action (operation 914) based on the predicted next detection point determined in operation 910.

For example, the data-dependent action may include scheduling a future performance of a data-dependent acquisition for the selected m/z based on the predicted next detection point. For instance, system 400 may schedule the data-dependent acquisition to be performed at a future time other than at the acquisition of the next mass spectrum. In some examples, system 400 selects the time for performing the data-dependent action based on the predicted intensity value and/or the predicted next detection point ratio. In this way, a data-dependent acquisition may be scheduled and subsequently performed when the intensity value of detected ions is at or near the maximum intensity value.

In some analyses, multiple different components included in sample 108 co-elute from liquid chromatograph 102 at substantially the same time. Accordingly, operations 906 to 914 may be performed for multiple distinct selected m/z.

Figure 10:
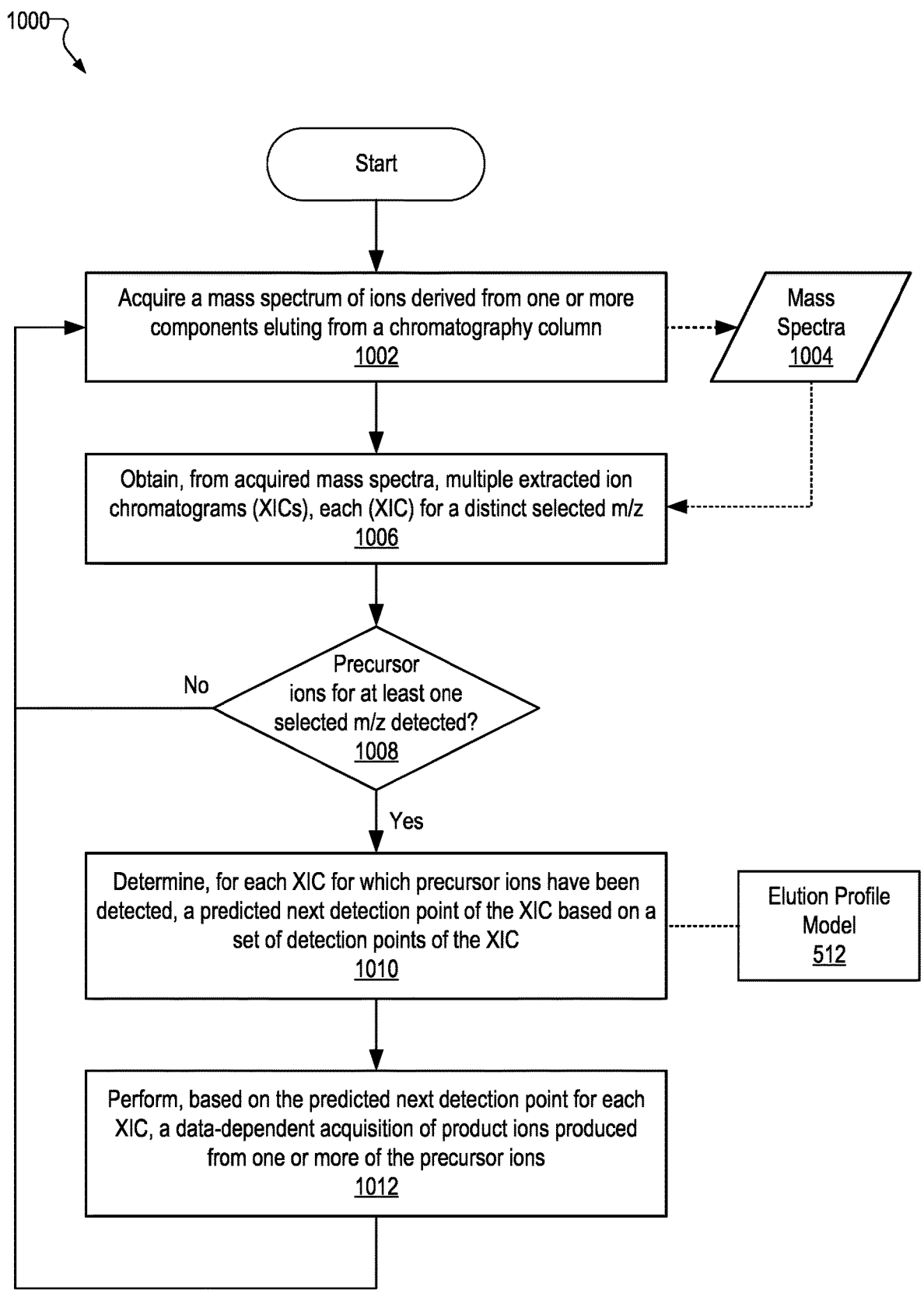
FIG. 10 shows another illustrative method of performing tandem mass spectrometry based on a predicted next detection point for each of a plurality of elution profiles.

FIG. 10 shows an illustrative method of performing tandem mass spectrometry to efficiently analyze a plurality of components of interest (corresponding to multiple distinct selected m/z). While FIG. 10 shows illustrative operations according to one embodiment, other embodiments may omit, add to, reorder, and/or modify any of the operations shown in FIG. 10. One or more of the operations shown in FIG. 10 may be performed by LC-MS system 100 and/or system 400, any components included therein, and/or any implementations thereof (e.g., by a remote computing system separate from LC-MS system 100).

In operation 1002, a mass spectrum of ions derived from components eluting from a chromatography column is acquired. Operation 1002 may be performed in any suitable way, including any way described herein (e.g., in a manner similar to operation 502 of method 500 or operation 902 of method 900). For example, mass analyzer 206 may perform a mass analysis of the ions, such as a full-spectrum MS scan or survey scan. The mass spectrum is stored (e.g., in storage facility 402) with a series of mass spectra 1004 previously acquired (if any) and stored during the experiment. If the mass spectrum is the first mass spectrum acquired during the experiment, the mass spectrum is stored and subsequently-acquired mass spectra may be combined with the mass spectrum to produce series of mass spectra 1004.

In operation 1006, system 400 obtains, from the series of mass spectra 1004, a plurality of XICs for multiple distinct selected m/z. Each XIC includes a plurality of detection points from a plurality of different mass spectrum acquisitions, and each XIC represents intensity of a distinct selected m/z as a function of time. Each selected m/z may be the m/z of precursor ions derived from a particular component of interest included in sample 108. In some examples, mass spectra 1004 are divided into multiple bins of distinct selected m/z and the XIC for each selected m/z is tracked over time. Operation 1006 may be performed in any suitable manner, including in the same or a similar manner as operation 506 described herein.

In operation 1008, system 400 determines, based on the series of mass spectra 1004, whether precursor ions of at least one of the multiple distinct selected m/z are detected. Operation 1008 may be performed in any suitable way. For example, system 400 may detect a peak in each XIC and/or determine that the detected intensity for at least one XIC reaches or exceeds a threshold level. Thus, system 400 may determine that precursor ions of at least one of the multiple distinct selected m/z are detected. If system 400 determines that precursor ions of at least one of the multiple distinct selected m/z are not detected, processing of method 1000 returns to operation 1002 for another acquisition. If, however, system 400 determines that precursor ions of at least one of the multiple distinct selected m/z are detected, processing of method 1000 proceeds to operation 1010.

In operation 1010, system 400 determines, for each XIC for which precursor ions have been detected, a predicted next detection point of each XIC based on elution profile model 512 and a set of detection points included in the respective XIC. Operation 1010 may be performed in any suitable manner, including in the same or a similar manner as operation 510 described herein.

In operation 1012, a data-dependent acquisition of product ions derived from the detected precursor ions is performed based on the predicted next detection point for each XIC. For example, if precursor ions for only one distinct selected m/z are detected, an MS/MS acquisition or a multi-stage MS$^n$ acquisition may be initiated for that distinct selected m/z, such as described with reference to method 900 and FIG. 9. However, if multiple components have co-eluted so that precursor ions for multiple distinct selected m/z are detected, a data-dependent acquisition cannot be performed for each selected m/z at the same time (e.g., performed at the same next acquisition). Accordingly, system 400 schedules a future performance of the data-dependent acquisition for each m/z based on the predicted next detection point for each selected m/z.

In some examples, system 400 schedules the future performance of each data-dependent acquisition in order of decreasing predicted intensity value of each selected m/z. In this scheduling scheme, a data-dependent acquisition for the selected m/z with the highest predicted intensity value is performed first before the quantity of ions decreases and a weak signal is obtained. In some examples, system 400 may identify, based on the predicted next detection point for each selected m/z, the detected precursor ions having a predicted intensity value greater than a threshold intensity value and filter out a future data-dependent acquisition for a selected m/z if the predicted intensity value is below a threshold minimum level. In this way, data-dependent acquisitions that would otherwise produce low-quality signals (e.g., low signal-to-noise ratio) can be omitted so that time can be devoted to data-dependent acquisitions for other selected m/z.

In further examples, system 400 assigns a priority value to each selected m/z and schedules the future performance of each data-dependent acquisition based on the assigned priority values. The priority values may be determined and assigned in any suitable way based on any suitable parameters. In some examples, the priority value of a selected m/z is the ratio of the predicted intensity value to the current intensity value. In this scheduling scheme, if the current intensity value of a selected m/z is high (e.g., at or near the apex of the elution peak) and is predicted to drop (e.g., the ratio is less than one) but still be above a threshold minimum level, the selected m/z should be interrogated in a data-dependent acquisition before the precursor ion signal disappears or falls below the minimum threshold level. Thus, the selected m/z will be assigned a higher priority than another selected m/z that has low intensity and is predicted to increase (e.g., the ratio is greater than one) and will therefore likely still have high intensity on a later cycle. In some embodiments, system 400 schedules the future performance of each data-dependent acquisition in order of increasing ratio of predicted intensity value to current intensity value. In this scheme, system 400 may also filter out a future data-dependent acquisition for a selected m/z if the predicted intensity value is below a threshold minimum level.

In further examples, system 400 may execute an optimization model to try to interrogate each selected m/z at the highest intensity value for each selected m/z. Any suitable optimization model may be used. In some examples, the optimization model may be based on reinforcement learning and may be configured as a game with an agent in which the goal is to interrogate all (or the most) of the detected precursor ions at their highest intensity value. The inputs may include, for example, the current intensity value, the predicted intensity value, and/or the ratio of the predicted intensity value to the current intensity value. Additionally or alternatively, an input vector may include a set of the most recent detected intensity values (e.g., set 606 or set 702) with the predicted intensity value tacked on the end of that input vector.

In methods 500, 1200, 900, and 1000, system 400 determines a predicted next detection point based on elution profile model 512 and a set of recently-acquired detection points. As mentioned, in some examples elution profile model 512 includes a trained machine learning model configured to determine a predicted next detection point of an elution profile based on a set of recently-acquired detection points. Illustrative systems and methods of training a machine learning model implementing elution profile model 512 will now be described.

Figure 11:
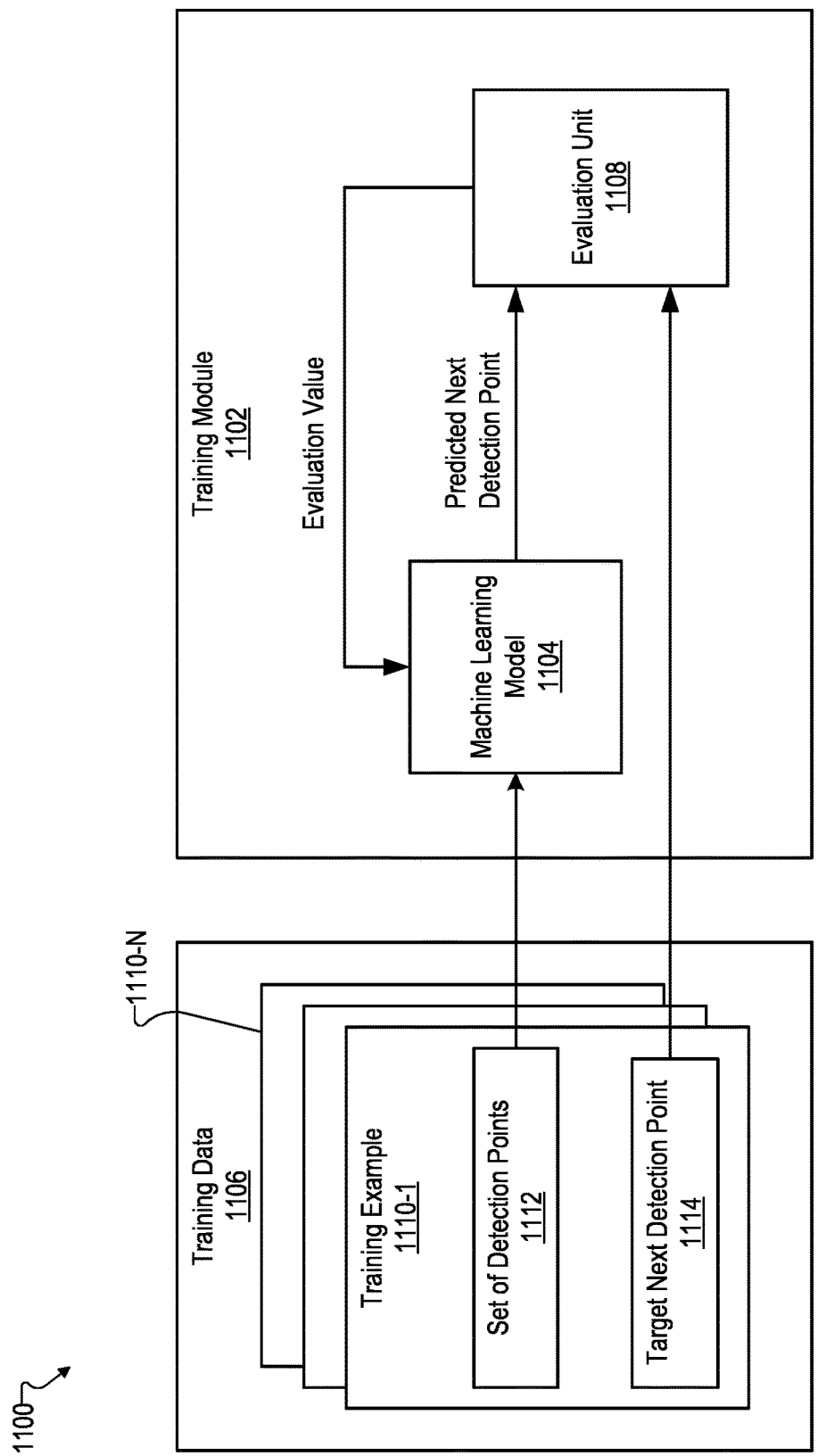
FIG. 11 shows a block diagram of an illustrative training stage in which a training module trains a machine learning model to predict a next detection point in an elution profile.

FIG. 11 shows a block diagram of an illustrative training stage 1100 in which a training module 1102 trains a machine learning model 1104, using training data 1106 and an evaluation unit 1108, to determine a predicted next detection point of an elution profile. Training of machine learning model 1104 is described in detail herein with reference to FIGS. 12-14. When trained as described herein, machine learning model 1104 may implement elution profile model 512.

Training module 1102 may perform any suitable heuristic, process, and/or operation that may be configured to train a machine learning model. In some examples, training module 1102 is implemented by hardware and/or software components (e.g., processors, memories, communication interfaces, instructions stored in memory for execution by the processors, etc.). In some examples, training module 1102 is implemented by system 400, or any component or implementation thereof. For example, training module 1102 may be implemented by a controller of a mass spectrometer (e.g., controller 106 or controller 210). Alternatively, training module 1102 may be implemented by a computing system (e.g., a personal computer or a remote server) separate from but communicatively coupled with a controller of a mass spectrometer.

In some embodiments, machine learning model 1104 is implemented using one or more supervised and/or unsupervised learning algorithms. For example, machine learning model 1104 may be implemented by a linear regression model, a logistic regression model, a Support Vector Machine (SVM) model, a Boosted Decision Tree regression model, a Decision Forest regression model, a Fast Forest Quantile regression model, an ordinal regression model, and/or other learning models. Additionally or alternatively, machine learning model 1104 is implemented by a neural network having an input layer, one or more hidden layers, and an output layer. Non-limiting examples of a neural network include, but are not limited to, a Convolutional Neural Network (CNN), a Recurrent Neural Network (RNN), a Long Short-Term Memory (LSTM) neural network, and a Gated Recurrent Unit (GRU) neural network. Other system architectures for implementing machine learning model 1104 are also possible and contemplated.

Training data 1106 may be acquired or extracted from data representative of one or more elution profiles (e.g., a set of LC-MS detection points). For example, training data 1106 may be acquired from one or more TICs and/or one or more XICs. Training data 1106 includes a plurality of training examples 1110 (e.g., training examples 1110-1 through 1110-N). Each training example 1110 includes a set of detection points 1112 and a target next detection point 1114.

Figure 12:
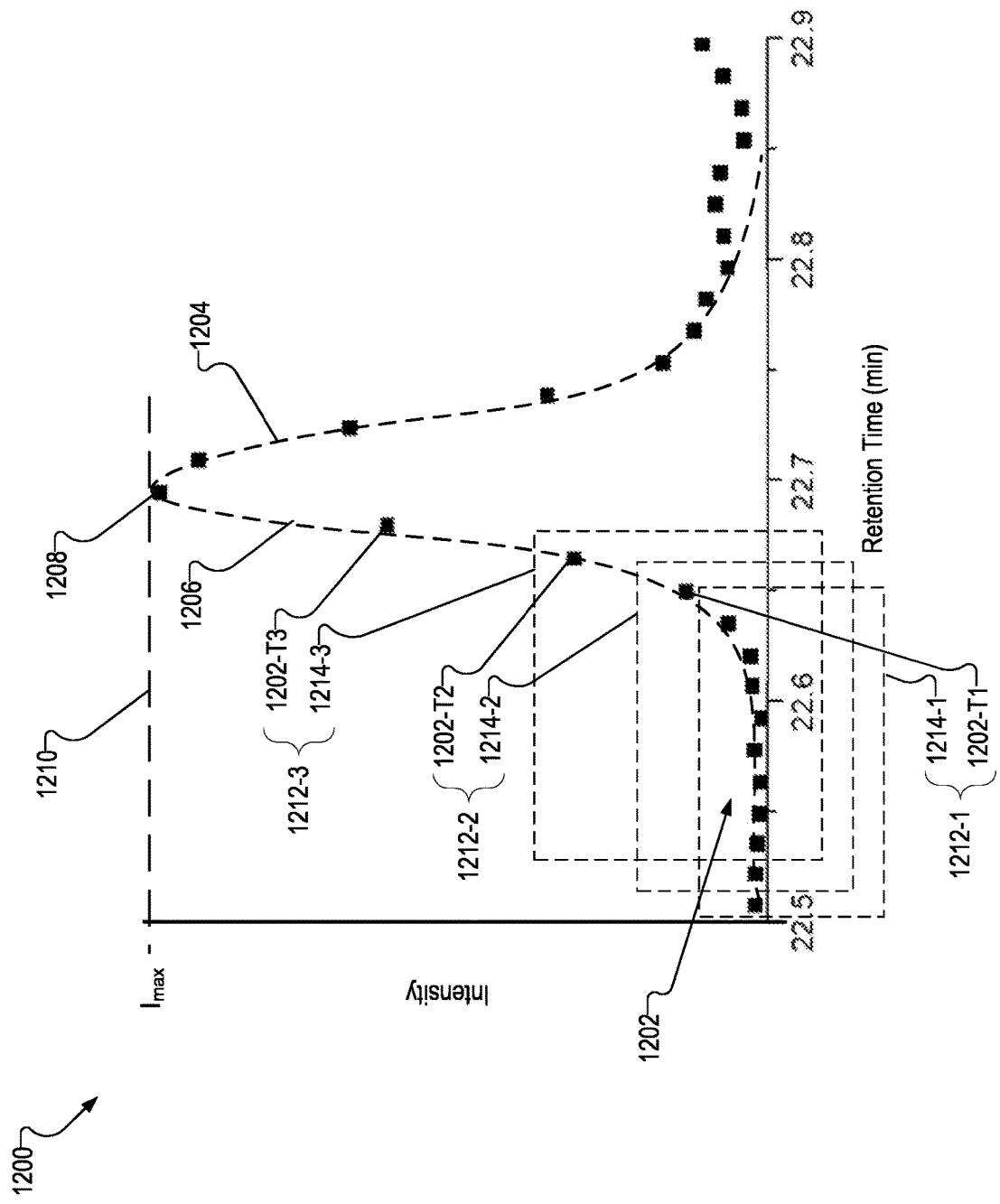
FIG. 12 shows an illustrative elution profile and training examples that may be obtained from the elution profile and included in training data used in the training stage of FIG. 11.

FIG. 12 shows an illustrative TIC 1200 that may be generated from, or is representative of, data acquired from LC-MS system 100, and shows illustrative training examples that may be obtained from TIC 1200. It will be recognized that machine learning model 1104 may be trained based on TIC 1200 raw source data or processed data without generating TIC 1200. As shown, TIC 1200 plots a plurality of detection points 1202 each representing a detected intensity value, as detected by a mass spectrometer during full-spectrum acquisitions, and retention time. Each successive acquisition adds a new detection point 1202 to TIC 1200. Detection points 1202 together form an elution profile 1204 of the components eluting from column 110. Elution profile 1204 includes a peak 1206 having an apex 1208 at which a detected intensity is at a maximum intensity value $I_{max}$, as indicated by dashed line 1210.

Training of machine learning model 1104 to determine a predicted next detection point is based on the principle that the intensity value of the next detection point 1202 following a sequence of detection points 1202 is a function of the detected intensity values of the sequence of detection points 1202. Accordingly, training data 1106 includes training examples 1212 provided as input vectors to machine learning model 1104. Training examples 1212 may implement training examples 1110. FIG. 12 shows three training examples 1212 (training examples 1212-1 through 1212-3), although training data 1106 may include any number of training examples 1212. As shown in FIG. 12, each training example 1212 includes a distinct set 1214 of detection points 1202 and a target next detection point 1202-T immediately following the respective set 1214. For example, a first training example 1212-1 includes a first set 1214-1 of detection points 1202 and a first target next detection point 1202-T1 (the next detection point 1202 following set 1214-1), a second training example 1212-2 includes a second set 1214-2 of detection points 1202 and a second target next detection point 1202-T2 (the next detection point 1202 following set 1214-2), a third training example 1212-3 includes a third set 1214-3 of detection points 1202 and a third target next detection point 1202-T3 (the next detection point 1202 following set 1214-3), and so on.

In the example of FIG. 12, each set 1214 includes a sequence of n consecutive detection points 1202. While FIG. 12 shows that n is ten, n may be any other number (e.g., 6, 16, 24, 35, 64, etc.), and may be selected to ensure machine learning model 1104 has sufficient data to determine the predicted next detection point. In some examples, the sequence of detection points 1202 in each set 1214 is not consecutive, but may be some other grouping (e.g., every other detection point 1202, every two of three detection points 1202, a random selection of detection points 1202, etc.). In further examples, once n detection points have been acquired, each training example 1212 includes all detection points 1202 included in one or more prior training examples 1212. In other examples, a set 1214 includes only the detection points 1202 that occur within a sliding time window. For example, the sliding time window may encompass a period of 0.1 seconds, 0.5 seconds, 3 seconds, etc.

Target next detection points 1202-T are the known desired output values from machine learning model 1104. Target next detection points 1202-T may be used for supervised training of machine learning model 1104, as will be explained below.

In some examples in which the source data does not evenly space the plurality of detection points 1202 along the time axis, the plurality of detection points 1202 (or the detection points 1202 of a training example 1212) may be adjusted, such as by interpolation, to a uniform time spacing (e.g., 1 second) to simplify processing by machine learning model 1104.

To simplify training of machine learning model 1104, detection points 1202 may in some examples be normalized to a reference intensity value. In some examples, the reference intensity value is the maximum intensity value $I_{max}$ at apex 1208 of peak 1206. However, any other normalization scheme may be used, and the reference intensity value may be any other suitable reference value, such as a known running average intensity value of the elution profile, a global maximum intensity value of the elution profile, a recent maximum intensity value, etc. In some examples, the normalization scheme may include a baseline slope and/or a baseline level correction. For example, the normalized intensity value may be determined as the ratio of the difference between the last intensity value and a baseline intensity value to the difference between the expected maximum intensity value $I_{max}$ and the baseline intensity value.

Referring again to FIG. 11, training data 1106 may be split into two sets of data, such that a first set of training data may be used for training machine learning model 1104 and a second set of training data may be used to score machine learning model 1104. For example, training data 1106 may be split so that a first percentage (e.g., 75%) of training examples 1110 are used as the training set for training machine learning model 1104 and a second percentage (e.g., 25%) of the training examples 1110 are used as the scoring set to generate an accuracy score for machine learning model 1104.

Evaluation unit 1108 is configured to determine (e.g., compute), based on the predicted next detection point output from machine learning model 1104 and target next detection point 1114, an evaluation value that is provided to machine learning model 1104. Training module 1102 may adjust one or more model parameters of machine learning model 1104 based on the evaluation value.

Figure 13:
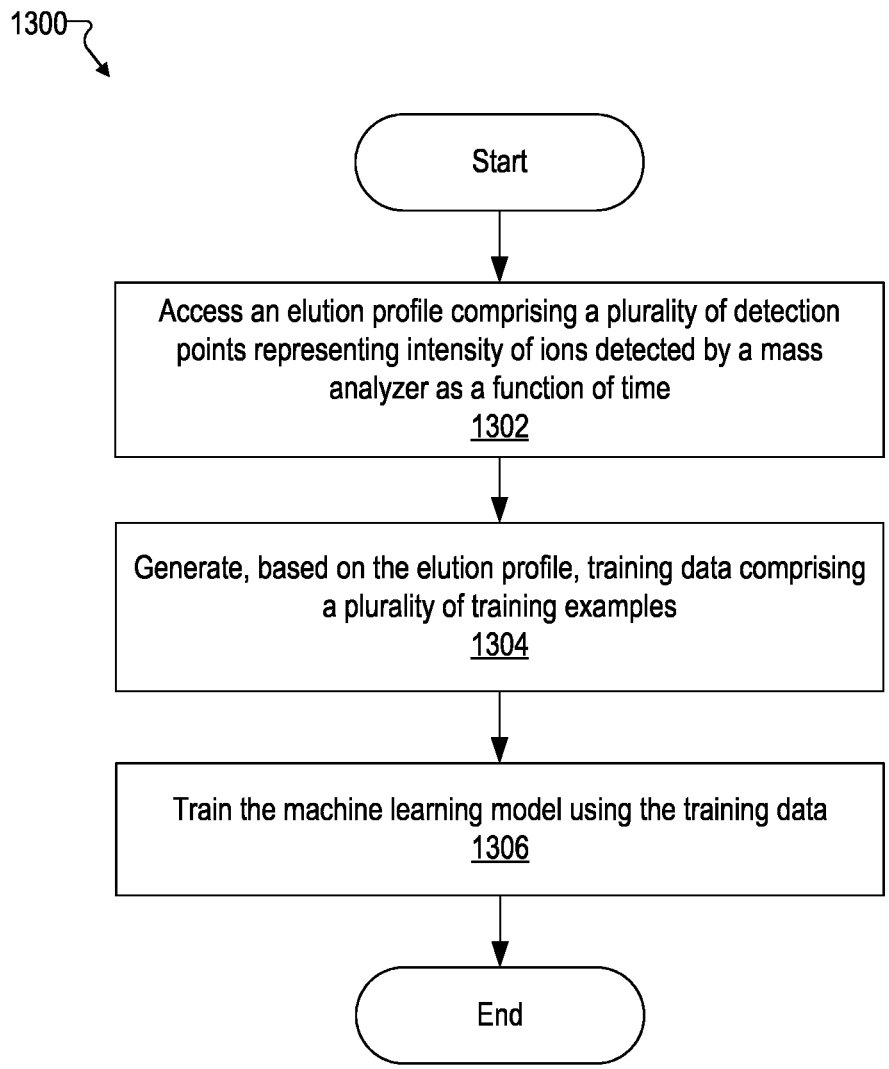
FIG. 13 shows an illustrative method of training the machine learning model of FIG. 11.

FIG. 13 shows an illustrative method 1300 that may be performed by training module 1102 to train machine learning model 1104. While FIG. 13 shows illustrative operations according to one embodiment, other embodiments may omit, add to, reorder, and/or modify one or more operations of the method 1300 depicted in FIG. 13. Each operation of method 1300 depicted in FIG. 13 may be performed in any manner described herein.

At operation 1302, training module 1102 accesses an elution profile including a plurality of detection points representing intensity of detected ions as a function of time. The ions are derived from components eluting from a chromatography column and detected by a mass analyzer.

At operation 1304, training module 1102 generates, based on the elution profile, training data including a plurality of training examples (e.g., training examples 1110). A training example of the plurality of training examples includes a set of detection points and a target next detection point. The target next detection point is a detection point of the plurality of detection points following the set of detection points. In some examples, generating the training data also includes interpolating the detection points to a uniform time scale and/or normalizing the detection points to a reference intensity value prior to (or after) generating the plurality of training examples.

At operation 1306, training module 1102 uses the training data to train machine learning model 1104 to determine a predicted next detection point following the set of detection points. Once trained, machine learning model 1104 may implement elution profile model 512 and may be used to determine a predicted next detection point of an elution profile during an analytical experiment.

Figure 14:
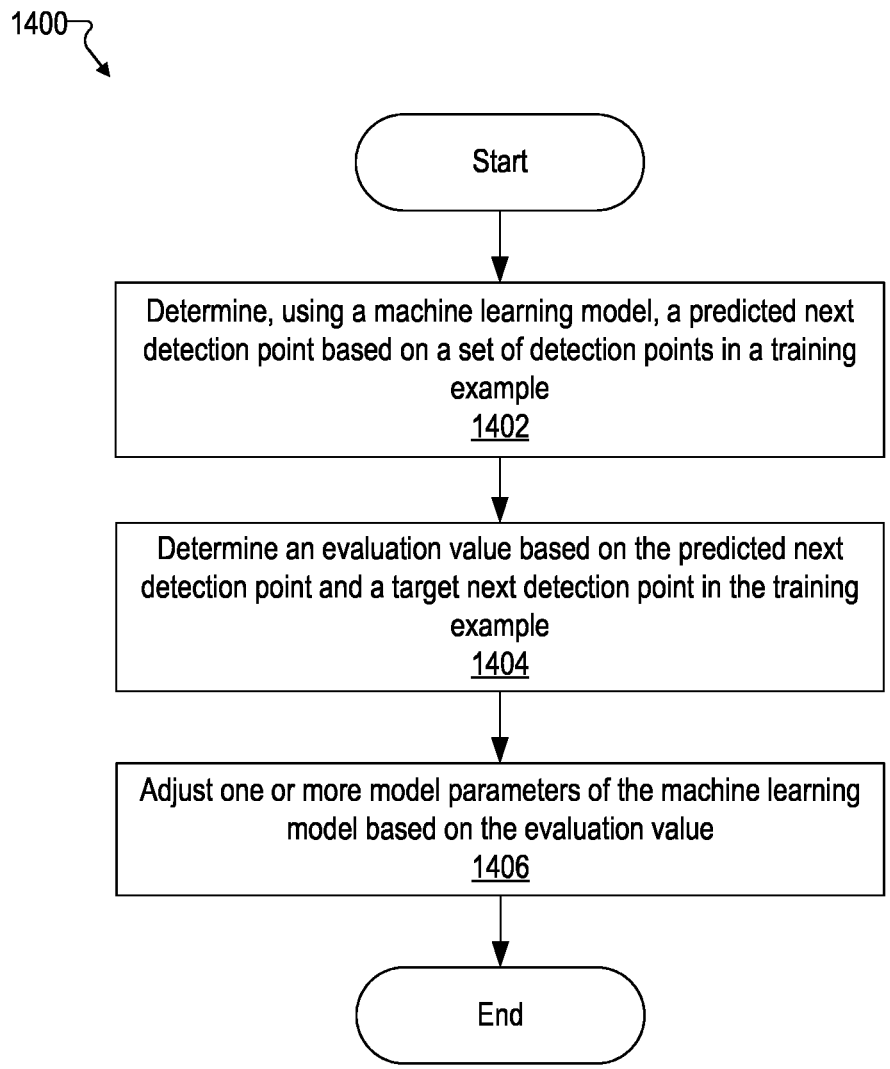
FIG. 14 shows an illustrative method of training the machine learning model of FIG. 11 with a training example.

FIG. 14 shows an illustrative method 1400 of training a machine learning model with a training example during training stage 1100 of FIG. 11. While FIG. 14 shows illustrative operations according to one embodiment, other embodiments may omit, add to, reorder, and/or modify one or more operations of the method 1400. Each operation of method 1400 depicted in FIG. 14 may be performed in any manner described herein.

At operation 1402, training module 1102 determines, using a machine learning model (e.g., machine learning model 1104), a predicted next detection point based on a set of detection points (e.g., a set 1112) in a training example (e.g., a training example 1110). For example, training module 1102 may apply the set of detection points to machine learning model 1104, and machine learning model 1104 may determine (e.g., compute) a predicted next detection point based on the input set of detection points.

At operation 1404, training module 1102 determines an evaluation value based on the predicted next detection point and the target next detection point (e.g., target next detection point 1114) in the training example. For example, as shown in FIG. 11, training module 1102 may input the predicted next detection point determined by machine learning model 1104 and the target next detection point 1114 in the training example 1110 into evaluation unit 1108. Evaluation unit 1108 may determine the evaluation value based on the determined predicted next detection point and the target next detection point 1114. The evaluation value is any value representing a comparison of the predicted next detection point to the target next detection point 1114. For example, the evaluation value may be a mean squared difference between the predicted next detection point results (e.g., the predicted intensity value) determined by machine learning model 1104 and the corresponding target next detection point 1114 (e.g., the target intensity value) of the training example. Other implementations for determining the evaluation value are also possible and contemplated.

At operation 1406, training module 1102 adjusts one or more model parameters of machine learning model 1104 based on the determined evaluation value. For example, as depicted in FIG. 11, training module 1102 may back-propagate the evaluation value determined by evaluation unit 1108 to machine learning model 1104, and adjust the model parameters of machine learning model 1104 (e.g., weight values assigned to various data elements in the training examples) based on the evaluation value.

In some embodiments, training module 1102 may determine whether the model parameters of machine learning model 1104 have been sufficiently adjusted. For example, training module 1102 may determine that machine learning model 1104 has been subjected to a predetermined number of training cycles and therefore has been trained with a predetermined number of training examples. Additionally or alternatively, training module 1102 may determine that the evaluation value (e.g., the mean squared difference between the predicted intensity value and the target intensity value) satisfies a predetermined evaluation value threshold for a threshold number of training cycles, and thus determine that the model parameters of machine learning model 1104 have been sufficiently adjusted. Additionally or alternatively, training module 1102 may determine that the evaluation value remains substantially unchanged for a predetermined number of training cycles (e.g., a difference between the evaluation values computed in sequential training cycles satisfies a difference threshold), and thus determine that the model parameters of machine learning model 1104 have been sufficiently adjusted.

In some embodiments, responsive to determining that the model parameters of machine learning model 1104 have been sufficiently adjusted, training module 1102 may determine that the training stage of machine learning model 1104 is completed and select the current values of the model parameters to be values of the model parameters in trained machine learning model 1104. Trained machine learning model 1104 may implement an elution profile model (e.g., elution profile model 512) configured to determine a predicted next detection point in an elution profile based on a set of detection points acquired during an analytical experiment.

In some examples, machine learning model 1104 is trained based on training data 1106 acquired during multiple different experiments performed under different sets of experiment conditions. As a result, trained machine learning model 1104 may be used (e.g., in methods 500, 800, 900, or 1000) across a wide range of experiment conditions. Experiment conditions include, without limitation, one or more of a flow rate of the separation system (e.g., nanoflow, microflow, high flow), a gradient of the chromatography column, a list of target analytes, a type of chromatography performed, or a type of stationary phase and/or mobile phase of the chromatography column. Machine learning model 1104 may be trained for use under a wide range of experiment conditions in any suitable way.

In some examples, training data 1106 includes a plurality of subsets of training data. Each subset of training data is acquired based on a distinct set of experiment conditions. Training module 1102 may train machine learning model 1104 on each individual subset of training data serially in a plurality of training stages. For example, training module 1102 may train machine learning model 1104 on a first subset of training data 1106 in a first training stage. Upon completion of training with the first subset, training module 1102 may train machine learning model 1104 on a second subset of training data 1106 in a second training stage. Upon completion of training with the second subset, training module 1102 may train machine learning model 1104 on a third subset of training data 1106 in a third training stage, and so forth.

Alternatively, data from multiple different subsets of training data may be mixed so that machine learning model 1104 is trained on the different subsets of training data in one training stage. For example, training examples from the various different subsets of training data may be mixed (e.g., randomly) to form training data 1106. In some embodiments, training examples associated with the same elution peak may be grouped together so that all training examples associated with the elution peak are trained in sequence before machine learning model 1104 is trained using training examples from a different group.

In some examples, each training example 1110 may further include, in addition to set of detection points 1112 and target next detection point 1114, data representative of one or more experiment conditions. The data representative of one or more experiment conditions may be automatically accessed or obtained by training module 1102 from the LC-MS system (e.g., from controller 106 or controller 210), or may be provided manually by a user.

In alternative examples, machine learning model 1104 is trained based on training data 1106 configured for a specific application, such as a selected m/z, specific experiment conditions, a specific sample type, etc. In such examples, machine learning model 1104 could be trained after acquiring data for an initial priming experiment, and machine learning model 1104 could be used thereafter only for subsequent iterations of that specific experiment.

In some examples, machine learning model 1104 may be refined or further trained in real time (e.g., during an analytical experiment). In some embodiments, training module 1102 may continue to collect training examples 1110 and train machine learning model 1104 with the collected training examples 1110 over time. For example, when training module 1102 collects one or more additional training examples from one or more data sources, training module 1102 may update the plurality of training examples to include both existing training examples and the additional training examples, and train machine learning model 1104 with the updated plurality of training examples according to the training process described herein. Additionally or alternatively, training module 1102 may periodically collect additional training examples from one or more data sources, update the plurality of training examples to include both existing training examples and the additional training examples, and train machine learning model 1104 with the updated plurality of training examples at predetermined intervals.

Elution profile model 512 may also be scored and/or updated (e.g., re-trained) in real-time during an analytical experiment based on data acquired during the analytical experiment (e.g., based on analytical acquisitions or scans). At various times throughout an analytical experiment, system 400 may perform an assessment to assess the performance of elution profile model 512 using analytical data already acquired up to that point. Assessments may be performed at any suitable time, such as periodically (e.g., every nth scan), randomly, or in response to a trigger event (e.g., an event indicating overfilling, such as detection of coalescence or peak broadening exceeding a threshold amount). Each assessment may assess the quality of elution profile model 512. If system 400 determines during an assessment that an error condition is satisfied, system 400 may retrain and/or update elution profile model 512 using the acquired experimental data.

For example, system 400 may obtain, based on the next mass spectrum, an acquired next detection point and compare the predicted intensity value of the predicted next detection point with the intensity value of the corresponding acquired detection point to determine an evaluation value for the predicted next detection point. If the evaluation value exceeds a threshold value (e.g., an error condition is satisfied), system 400 may retrain elution profile model 512 using the acquired experimental data. It will be recognized that other error conditions, such as signal drift (m/z drift) of the mass spectrometer, may trigger retraining of elution profile model 512 using the acquired experimental data.

If elution profile model 512 is updated during an analytical experiment, the updated elution profile model 512 may be used as the default elution profile model 512 for the next experiment. In this way, elution profile model 512 can be re-trained and updated on the fly without consuming additional time for re-training and updating. The real-time assessment and updating process need not require input from the user, thereby improving convenience for the user.

In some examples, an analytical experiment may begin with no accumulation time corrections or adjustments and instead use conventional methods of ion population regulation, or the analytical experiment may use an elution profile model previously trained on other previously acquired data (e.g., training data, analytical experiments, simulated data, etc.). During the analytical experiment, an elution profile model for the particular analytical experiment may be trained in real-time by using training data acquired during a first stage of the analytical experiment. In a second stage of the analytical experiment, system 400 may implement method 800 using the elution profile model trained in the first stage to regulate the ion population. The second stage may begin after a threshold has been reached, such as a minimum number of peak elutions, a minimum time elapsed, detection of a particular analyte, a minimum total ion current, etc. The initial training data for training the elution profile model, including data acquired in the first segment of the analytical experiment, may be small but useable, and may be refined in subsequent updates, as described above. In some examples, the elution profile model may be refined and updated based on training data acquired during the second stage of the analytical experiment. If updates made during the second stage fall outside some threshold boundaries (e.g., an evaluation value exceeds an acceptable tolerance), system 400 may revert to using the conventional methods of ion population regulation or using an elution profile model trained previously on other training data not acquired during the analytical experiment.

Various modifications may be made to the methods, apparatuses, and systems described herein. In some examples, the principles described herein may be applied to regulation of ion population through a transmission-type instrument rather than in a trapping-type instrument that accumulates ions. In these examples, the term "injection time" refers to the period of time over which ions are injected into a device, such as a time-of-flight (ToF) mass filter or a quadrupole mass filter and may be used interchangeably with accumulation time. Some transmission-type instruments may additionally or alternatively use ion attenuation to regulate the intensity of the beam that hits the detector and thereby regulate the ion population. In these examples, the degree of ion attenuation may be regulated in a manner similar to regulation of injection time and may be regulated independently or together with regulation of injection time.

In additional modifications, a separation device (e.g., a liquid chromatograph, a gas chromatograph, a capillary electrophoresis device, etc.) and/or a mass spectrometer (e.g., mass spectrometer 104) may include or may be coupled with an ion mobility analyzer, and data acquired by the ion mobility analyzer may be used to train an elution profile model and determine a predicted next detection point in a manner similar to the methods described above for data acquired by the mass spectrometer. For example, a first set of data acquired with an ion mobility analyzer and a mass analyzer may include a series of mass spectra including intensity values of ions produced from the sample components as a function of m/z and/or ion mobility of the ions (e.g., a collision cross-section (CCS) of the ions). A second set of data may be extracted from the first set of data. The extracted second set of data may include a plurality of detection points representing intensity, as detected by the mass analyzer, as a function of time for a selected m/z and/or a selected CCS or range of CCS. The second set of data may be used in any way described herein, such as to train an elution profile model and/or to determine a predicted next detection point for the selected CCS or range of CCS.

In some examples, system 400 may be configured to request user input to manage or adjust settings of the ion population regulation processes. For example, system 400 may obtain, from a user, method settings, a list of target analytes, a selected m/z, and/or any other initial or default values of parameters associated with elution profile model 512. System 400 may also be configured to notify the user of certain changes, such as when the accumulation time changes or changes by a threshold amount, or the need for changes, such as when an assessment indicates parameters should be adjusted.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 15:
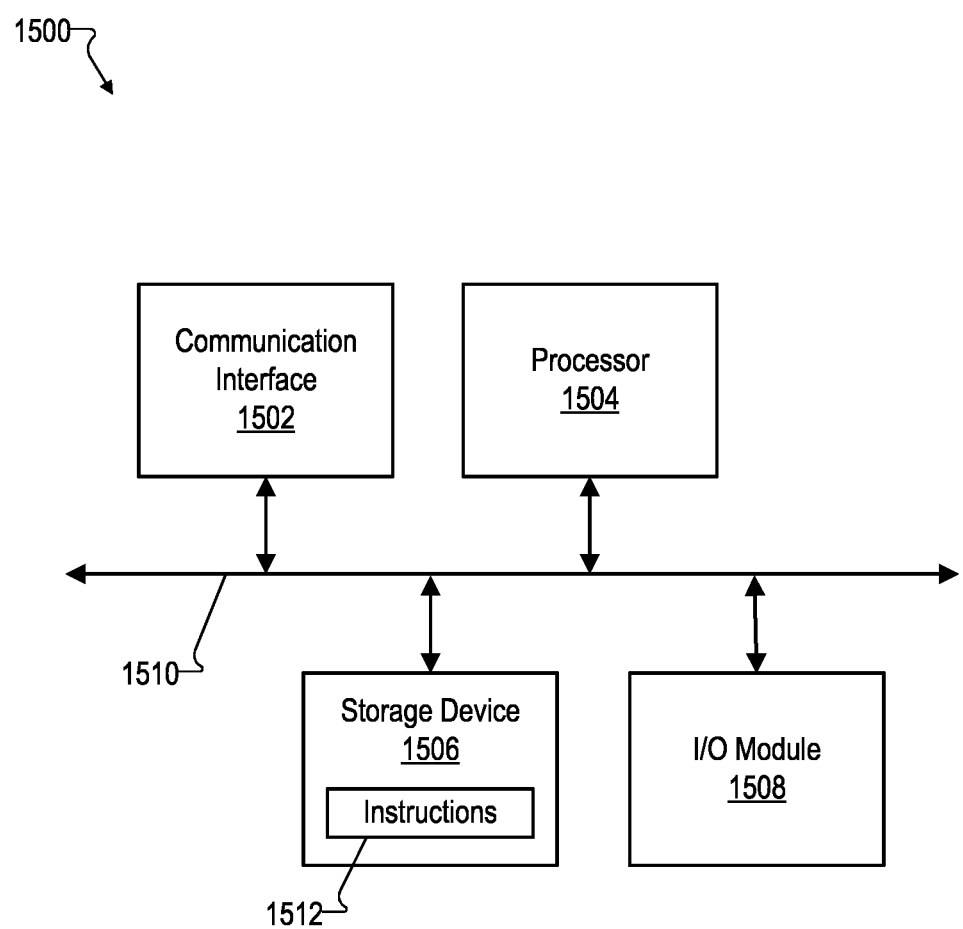
FIG. 15 shows an illustrative computing device.

FIG. 15 shows an illustrative computing device 1500 that may be specifically configured to perform one or more of the processes described herein. As shown in FIG. 15, computing device 1500 may include a communication interface 1502, a processor 1504, a storage device 1506, and an input/output ("I/O") module 1508 communicatively connected one to another via a communication infrastructure 1510. While an illustrative computing device 1500 is shown in FIG. 15, the components illustrated in FIG. 15 are not intended to be limiting. Additional or alternative components may be used in other embodiments. Components of computing device 1500 shown in FIG. 15 will now be described in additional detail.

Communication interface 1502 may be configured to communicate with one or more computing devices. Examples of communication interface 1502 include, without limitation, a wired network interface (such as a network interface card), a wireless network interface (such as a wireless network interface card), a modem, an audio/video connection, and any other suitable interface.

Processor 1504 generally represents any type or form of processing unit capable of processing data and/or interpreting, executing, and/or directing execution of one or more of the instructions, processes, and/or operations described herein. Processor 1504 may perform operations by executing computer-executable instructions 1512 (e.g., an application, software, code, and/or other executable data instance) stored in storage device 1506.

Storage device 1506 may include one or more data storage media, devices, or configurations and may employ any type, form, and combination of data storage media and/or device. For example, storage device 1506 may include, but is not limited to, any combination of the non-volatile media and/or volatile media described herein. Electronic data, including data described herein, may be temporarily and/or permanently stored in storage device 1506. For example, data representative of computer-executable instructions 1512 configured to direct processor 1504 to perform any of the operations described herein may be stored within storage device 1506. In some examples, data may be arranged in one or more databases residing within storage device 1506.

I/O module 1508 may include one or more I/O modules configured to receive user input and provide user output. One or more I/O modules may be used to receive input for a single virtual experience. I/O module 1508 may include any hardware, firmware, software, or combination thereof supportive of input and output capabilities. For example, I/O module 1508 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1508 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1500. For example, storage facility 402 may be implemented by storage device 1506, and processing facility 404 may be implemented by processor 1504.

It will be recognized by those of ordinary skill in the art that while, in the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

Advantages and features of the present disclosure can be further described by the following examples:

Example 1. A method of performing mass spectrometry, comprising obtaining, based on a series of mass spectra of detected ions derived from components eluting from a chromatography column, an elution profile comprising a plurality of detection points representing intensity of the detected ions as a function of time; and determining, based on a set of detection points included in the plurality of detection points, a predicted next detection point of the elution profile to be obtained based on a next mass spectrum to be acquired.

Example 2. The method of example 1, wherein determining the predicted next detection point comprises applying the set of detection points to a trained machine learning model configured to determine the predicted next detection point based on the set of detection points.

Example 3. The method of example 2, wherein the trained machine learning model comprises a Recurrent Neural Network (RNN).

Example 4. The method of example 2, wherein the trained machine learning model comprises a Long Short-Term Memory (LSTM) neural network or a Gated Recurrent Unit (GRU) neural network.

Example 5. The method of example 1, further comprising: acquiring, subsequent to acquisition of the series of mass spectra, the next mass spectrum; obtaining, based on the next mass spectrum, an acquired next detection point; determining, based on a comparison of the predicted next detection point and the acquired next detection point, that the predicted next detection point satisfies an error condition; and training, based on the determining that the predicted next detection point satisfies the error condition, the machine learning model based on the plurality of detection points of the elution profile and the acquired next detection point.

Example 6. The method of example 1, further comprising selecting, based on a set of experiment conditions for analyzing a sample comprising the components eluting from the chromatography column, the trained machine learning model from among a plurality of machine learning models each trained for a particular set of experiment conditions.

Example 7. The method of example 6, wherein the set of experiment conditions comprises at least one of a flow rate of the chromatography column, a gradient of the chromatography column, a list of target analytes included in the sample, a type of chromatography performed, or a type of stationary phase and/or mobile phase of the chromatography column.

Example 8. The method of example 1, wherein the trained machine learning model was trained based on mass spectra acquired from a plurality of experiments each performed with a different set of experiment conditions.

Example 9. The method of example 1, further comprising setting, based on the predicted next detection point and for an acquisition of the next mass spectrum, an accumulation time for accumulating the ions produced from the components eluting from the chromatography column.

Example 10. The method of example 9, wherein setting the accumulation time comprises: estimating, based on the predicted next detection point, an ion flux of the ions produced from the components eluting from the chromatography column during the acquisition of the next mass spectrum; and determining the accumulation time as a target population of ions divided by the estimated ion flux during the acquisition of the next mass spectrum.

Example 11. The method of example 1, wherein the elution profile comprises an extracted ion chromatogram for a selected m/z.

Example 12. The method of example 11, further comprising: detecting, based on the series of mass spectra, precursor ions having the selected m/z; performing, based on the detecting of the ions having the selected m/z, the determining of the predicted next detection point; and performing, based on the predicted next detection point, a data-dependent acquisition of product ions produced from the precursor ions.

Example 13. An apparatus for performing mass spectrometry, comprising: a mass analyzer configured to acquire, over time, a series of mass spectra of detected ions derived from components eluting from a chromatography column; and a computing device configured to: obtain, based on the series of mass spectra, an elution profile comprising a plurality of detection points representing intensity of the detected ions as a function of time; and determine, based on a set of detection points included in the plurality of detection points, a predicted next detection point of the elution profile to be obtained based on a next mass spectrum to be acquired by the mass analyzer subsequent to acquisition of the series of mass spectra.

Example 14. The apparatus of example 13, wherein the computing device is configured to determine the predicted next detection point by applying the set of detection points to a trained machine learning model configured to determine the predicted next detection point based on the set of detection points.

Example 15. The apparatus of example 14, wherein the trained machine learning model comprises a Recurrent Neural Network (RNN).

Example 16. The apparatus of example 14, wherein the trained machine learning model comprises a Long Short-Term Memory (LSTM) neural network or a Gated Recurrent Unit (GRU) neural network.

Example 17. The apparatus of example 13, wherein: the mass analyzer is further configured to acquire, subsequent to acquisition of the series of mass spectra, the next mass spectrum; and the computing device is further configured to: obtain, based on the next mass spectrum, an acquired next detection point; determine, based on a comparison of the predicted next detection point and the acquired next detection point, that the predicted next detection point satisfies an error condition; and train, based on the determining that the predicted next detection point satisfies the error condition, the machine learning model based on the plurality of detection points of the elution profile and the acquired next detection point.

Example 18. The apparatus of example 13, wherein the computing device is further configured to select, based on a set of experiment conditions for analyzing a sample comprising the components eluting from the chromatography column, the trained machine learning model from among a plurality of machine learning models each trained for a particular set of experiment conditions.

Example 19. The apparatus of example 18, wherein the set of experiment conditions comprises at least one of a flow rate of the chromatography column, a gradient of the chromatography column, a list of target analytes included in the sample, a type of chromatography performed, or a type of stationary phase and/or mobile phase of the chromatography column.

Example 20. The apparatus of example 13, wherein the trained machine learning model was trained based on mass spectra acquired from a plurality of experiments each performed with a different set of experiment conditions.

Example 21. The apparatus of example 13, wherein the computing device is further configured to set, based on the predicted next detection point and for an acquisition of the next mass spectrum, an accumulation time for accumulating the ions produced from the components eluting from the chromatography column.

Example 22. The apparatus of example 21, wherein setting the accumulation time for the acquisition of the next mass spectrum comprises: estimating, based on the predicted next detection point, an ion flux of the ions produced from the components eluting from the chromatography column during the acquisition of the next mass spectrum; and determining the accumulation time as a target population of ions divided by the estimated ion flux during the acquisition of the next mass spectrum.

Example 23. The apparatus of example 13, wherein the elution profile comprises an extracted ion chromatogram for a selected m/z.

Example 24. The apparatus of example 23, wherein the computing device is further configured to: detect, based on the series of mass spectra, precursor ions having the selected m/z; perform, based on the detecting of the ions having the selected m/z, the determining the predicted next detection point; and perform, based on the predicted next detection point, a data-dependent acquisition of product ions produced from the precursor ions.

Example 25. A method of performing mass spectrometry, comprising: obtaining, based on a series of mass spectra of detected ions derived from components eluting from a chromatography column, a plurality of extracted ion chromatograms (XICs), each XIC comprising a plurality of detection points representing detected intensity for a distinct selected m/z as a function of time; detecting, based on the series of mass spectra, precursor ions of each distinct selected m/z of the plurality of XICs; and determining, for each XIC based on a set of detection points of the XIC, a predicted next detection point to be obtained based on a next mass spectrum to be acquired.

Example 26. The method of example 25, further comprising: identifying, based on the predicted next detection point for each XIC of the plurality of XICs, the detected precursor ions having a predicted intensity value greater than a threshold intensity value; and performing a data-dependent acquisition for the identified precursor ions.

Example 27. The method of example 25, further comprising setting a priority of data-dependent acquisitions for the precursor ions based on the predicted next detection point for each XIC of the plurality of XICs.

Example 28. The method of example 27, wherein the priority of data-dependent acquisitions is set based on an intensity value of each predicted next detection point.

Example 29. The method of example 27, wherein the priority of data-dependent acquisitions is set based on a ratio of the predicted next detection point to a current detection point for each XIC included in the plurality of XICs.

Example 30. The method of example 25, wherein determining the predicted next detection point for each XIC comprises applying the set of detection points of the XIC to a trained machine learning model configured to determine the predicted next detection point based on the set of detection points.

Example 31. The method of example 30, wherein the trained machine learning model comprises a Recurrent Neural Network (RNN).

Example 32. The method of example 31, wherein the trained machine learning model comprises a Long Short-Term Memory (LSTM) neural network or a Gated Recurrent Unit (GRU) neural network.

Example 33. A computer-implemented method of training a machine learning model, the method comprising: accessing an elution profile comprising a plurality of detection points representing intensity of ions derived from components eluting from a chromatography column and detected by a mass analyzer as a function of time; generating, based on the elution profile, training data comprising a plurality of training examples, a training example of the plurality of training examples comprising a set of detection points and a target next detection point, the target next detection point comprising a detection point of the plurality of detection points following the set of detection points; and training, using the training data, the machine learning model to determine a predicted next detection point, the predicted next detection point following the set of detection points.

Example 34. The computer-implemented method of example 33, wherein training the machine learning model comprises: determining, using the machine learning model and based on the set of detection points in the training example, the predicted next detection point of the elution profile; determining an evaluation value based on the predicted next detection point and the target next detection point in the training example; and adjusting one or more model parameters of the machine learning model based on the evaluation value.

Example 35. The computer-implemented method of example 33, further comprising: accessing a series of mass spectra of the detected ions; and obtaining the elution profile based on the series of mass spectra.

Example 36. The computer-implemented method of example 35, wherein generating the training data comprises interpolating the plurality of detection points to a uniform time scale.

Example 37. The computer-implemented method of example 35, wherein generating the training data comprises normalizing the plurality of detection points relative to a reference intensity value.

Example 38. The computer-implemented method of example 33, wherein the machine learning model comprises a Recurrent Neural Network (RNN).

Example 39. The computer-implemented method of example 33, wherein the machine learning model comprises a Long Short-Term Memory (LSTM) neural network or a Gated Recurrent Unit (GRU) neural network.

Example 40. The computer-implemented method of example 33, wherein the training data comprises a plurality of subsets of training data, each subset of training data based on a distinct set of experiment conditions.

Example 41. The computer-implemented method of example 40, wherein training the machine learning model using the training data comprises training the machine learning model on each subset of training data included in the plurality of subsets of training data serially in a plurality of training stages.

Example 42. The computer-implemented method of example 40, wherein training the machine learning model using the training data comprises: mixing the plurality of subsets of training data; and training the machine learning model on the mixed subsets of training data in a same training stage.

Example 43. The computer-implemented method of example 40, wherein each set of experiment conditions specifies at least one of a flow rate of the chromatography column, a gradient of the chromatography column, a list of target analytes included in a sample comprising the components eluting from the chromatography column, a type of chromatography performed, or a type of stationary phase and/or mobile phase of the chromatography column.

Example 44. A non-transitory computer-readable medium storing instructions that, when executed, cause a processor of a computing device to: obtain, based on a series of mass spectra of detected ions derived from components eluting from a chromatography column, an elution profile comprising a plurality of detection points representing intensity of the detected ions as a function of time; and determine, based on a set of detection points included in the plurality of detection points, a predicted next detection point of the elution profile to be obtained based on a next mass spectrum to be acquired.

Example 45. The non-transitory computer-readable medium of example 44, wherein the instructions, when executed, cause the processor to determine the predicted next detection point by applying the set of detection points to a trained machine learning model configured to determine the predicted next detection point based on the set of detection points.

Example 46. The non-transitory computer-readable medium of example 45, wherein the trained machine learning model comprises a Recurrent Neural Network (RNN).

Example 47. The non-transitory computer-readable medium of example 44, wherein the instructions, when executed, further cause the processor to set, based on the predicted next detection point and for an acquisition of the next mass spectrum, an accumulation time for accumulating the ions produced from the components eluting from the chromatography column.

Example 48. The non-transitory computer-readable medium of example 47, wherein the instructions, when executed, cause the processor to set the accumulation time by: estimating, based on the predicted next detection point, an ion flux of the ions produced from the components eluting from the chromatography column during the acquisition of the next mass spectrum; and determining the accumulation time as a target population of ions divided by the estimated ion flux during the acquisition of the next mass spectrum.

Example 49. The non-transitory computer-readable medium of example 44, wherein the elution profile comprises an extracted ion chromatogram for a selected m/z.

Example 50. The non-transitory computer-readable medium of example 49, wherein the instructions, when executed, further cause the processor to: detect, based on the series of mass spectra, precursor ions having the selected m/z; perform, based on the detected the ions having the selected m/z, the determining the predicted next detection point; and performing, based on the predicted next detection point, a data-dependent acquisition of product ions produced from the precursor ions.

What is claimed is:

1. A method of performing mass spectrometry, comprising:
    obtaining, based on a series of mass spectra of detected ions derived from components eluting from a chromatography column, an elution profile comprising a plurality of detection points representing intensity of the detected ions as a function of time; and
    determining, based on a set of detection points included in the plurality of detection points, a predicted next detection point of the elution profile to be obtained based on a next mass spectrum to be acquired.

2. The method of claim 1, wherein determining the predicted next detection point comprises applying the set of detection points to a trained machine learning model configured to determine the predicted next detection point based on the set of detection points.

3. The method of claim 2, wherein the trained machine learning model comprises a Recurrent Neural Network (RNN).

4. The method of claim 2, wherein the trained machine learning model comprises a Long Short-Term Memory (LSTM) neural network or a Gated Recurrent Unit (GRU) neural network.

5. The method of claim 1, further comprising:
    acquiring, subsequent to acquisition of the series of mass spectra, the next mass spectrum;
    obtaining, based on the next mass spectrum, an acquired next detection point;
    determining, based on a comparison of the predicted next detection point and the acquired next detection point, that the predicted next detection point satisfies an error condition; and
    training, based on the determining that the predicted next detection point satisfies the error condition, the machine learning model based on the plurality of detection points of the elution profile and the acquired next detection point.

6. The method of claim 1, further comprising selecting, based on a set of experiment conditions for analyzing a sample comprising the components eluting from the chromatography column, the trained machine learning model from among a plurality of machine learning models each trained for a particular set of experiment conditions.

7. The method of claim 6, wherein the set of experiment conditions comprises at least one of a flow rate of the chromatography column, a gradient of the chromatography column, a list of target analytes included in the sample, a type of chromatography performed, or a type of stationary phase and/or mobile phase of the chromatography column.

8. The method of claim 1, wherein the trained machine learning model was trained based on mass spectra acquired from a plurality of experiments each performed with a different set of experiment conditions.

9. The method of claim 1, further comprising setting, based on the predicted next detection point and for an acquisition of the next mass spectrum, an accumulation time for accumulating the ions produced from the components eluting from the chromatography column.

10. The method of claim 9, wherein setting the accumulation time comprises:
    estimating, based on the predicted next detection point, an ion flux of the ions produced from the components eluting from the chromatography column during the acquisition of the next mass spectrum; and
    determining the accumulation time as a target population of ions divided by the estimated ion flux during the acquisition of the next mass spectrum.

11. The method of claim 1, wherein the elution profile comprises an extracted ion chromatogram for a selected m/z.

12. The method of claim 11, further comprising:
    detecting, based on the series of mass spectra, precursor ions having the selected m/z;
    performing, based on the detecting of the ions having the selected m/z, the determining of the predicted next detection point; and
    performing, based on the predicted next detection point, a data-dependent acquisition of product ions produced from the precursor ions.

13. An apparatus for performing mass spectrometry, comprising:
    a mass analyzer configured to acquire, over time, a series of mass spectra of detected ions derived from components eluting from a chromatography column; and
    a computing device configured to:
        obtain, based on the series of mass spectra, an elution profile comprising a plurality of detection points representing intensity of the detected ions as a function of time; and
        determine, based on a set of detection points included in the plurality of detection points, a predicted next detection point of the elution profile to be obtained based on a next mass spectrum to be acquired by the mass analyzer subsequent to acquisition of the series of mass spectra.

14. The apparatus of claim 13, wherein the computing device is configured to determine the predicted next detection point by applying the set of detection points to a trained machine learning model configured to determine the predicted next detection point based on the set of detection points.

15. The apparatus of claim 14, wherein the trained machine learning model comprises a Recurrent Neural Network (RNN).

16. The apparatus of claim 14, wherein the trained machine learning model comprises a Long Short-Term Memory (LSTM) neural network or a Gated Recurrent Unit (GRU) neural network.

17. The apparatus of claim 13, wherein:
    the mass analyzer is further configured to acquire, subsequent to acquisition of the series of mass spectra, the next mass spectrum; and
    the computing device is further configured to:
        obtain, based on the next mass spectrum, an acquired next detection point;
        determine, based on a comparison of the predicted next detection point and the acquired next detection point, that the predicted next detection point satisfies an error condition; and
        train, based on the determining that the predicted next detection point satisfies the error condition, the machine learning model based on the plurality of detection points of the elution profile and the acquired next detection point.

18. The apparatus of claim 13, wherein the computing device is further configured to select, based on a set of experiment conditions for analyzing a sample comprising the components eluting from the chromatography column, the trained machine learning model from among a plurality of machine learning models each trained for a particular set of experiment conditions.

19. The apparatus of claim 18, wherein the set of experiment conditions comprises at least one of a flow rate of the chromatography column, a gradient of the chromatography column, a list of target analytes included in the sample, a type of chromatography performed, or a type of stationary phase and/or mobile phase of the chromatography column.

20. The apparatus of claim 13, wherein the trained machine learning model was trained based on mass spectra acquired from a plurality of experiments each performed with a different set of experiment conditions.

21. The apparatus of claim 13, wherein the computing device is further configured to set, based on the predicted next detection point and for an acquisition of the next mass spectrum, an accumulation time for accumulating the ions produced from the components eluting from the chromatography column.

22. The apparatus of claim 21, wherein setting the accumulation time for the acquisition of the next mass spectrum comprises:
    estimating, based on the predicted next detection point, an ion flux of the ions produced from the components eluting from the chromatography column during the acquisition of the next mass spectrum; and
    determining the accumulation time as a target population of ions divided by the estimated ion flux during the acquisition of the next mass spectrum.

23. The apparatus of claim 13, wherein the elution profile comprises an extracted ion chromatogram for a selected m/z.

24. The apparatus of claim 23, wherein the computing device is further configured to:
    detect, based on the series of mass spectra, precursor ions having the selected m/z;
    perform, based on the detecting of the ions having the selected m/z, the determining the predicted next detection point; and
    perform, based on the predicted next detection point, a data-dependent acquisition of product ions produced from the precursor ions.

* * * * *